United States Patent
Lee et al.

(10) Patent No.: US 12,457,328 B2
(45) Date of Patent: Oct. 28, 2025

(54) VIDEO COMPRESSION USING TEMPLATE-BASED DETERMINATION OF INTRA PREDICTION MODE

(71) Applicant: Comcast Cable Communications, LLC, Philadelphia, PA (US)

(72) Inventors: Young-Yoon Lee, McLean, VA (US); Alexey Konstantinovich Filippov, Khimki (RU); Vasily Alexeevich Rufitskiy, Vladimir (RU)

(73) Assignee: Comcast Cable Communications, LLC, Philadelphia, PA (US)

( * ) Notice: Subject to any disclaimer, the term of this patent is extended or adjusted under 35 U.S.C. 154(b) by 158 days.

(21) Appl. No.: 18/302,293

(22) Filed: Apr. 18, 2023

(65) Prior Publication Data

US 2023/0336718 A1 Oct. 19, 2023

Related U.S. Application Data

(60) Provisional application No. 63/332,028, filed on Apr. 18, 2022.

(51) Int. Cl.
*H04N 19/11* (2014.01)
*H04N 19/176* (2014.01)
*H04N 19/186* (2014.01)

(52) U.S. Cl.
CPC ........... *H04N 19/11* (2014.11); *H04N 19/176* (2014.11); *H04N 19/186* (2014.11)

(58) Field of Classification Search
CPC .... H04N 19/11; H04N 19/176; H04N 19/186; H04N 19/44; H04N 19/593
See application file for complete search history.

(56) References Cited

U.S. PATENT DOCUMENTS

2022/0141453 A1   5/2022   Huo et al.

FOREIGN PATENT DOCUMENTS

KR    20220016938 A    2/2022
WO    WO-2023193253 A1 *   10/2023   ........... H04N 19/593

OTHER PUBLICATIONS

Yoshinori Suzuki, Choong Seng Boon and Sadaatsu Kato, "Block-Based Reduced Resolution Inter Frame Coding With Template Matching Prediction", Research Laboratories, NTT DoComo, Inc. 1-4244-0481-9/06/$20.00 C2006 IEEE.

T. K. Tan, C. S. Boon and Y. Suzuki, "Intra Prediction by Template Matching," 2006 International Conference on Image Processing, 2006, pp. 1693-1696, doi: 10.1109/ICIP.2006.312685.

Cuiling Lan, Jizheng Xu, Feng Wu and Guangming Shi, "Intra Frame Coding With Template Matching Prediction and Adaptive Transform", Proceedings of 2010 IEEE 17th International Conference on Image Processing Sep. 26-29, 2010, Hong Kong.

(Continued)

*Primary Examiner* — Dakshesh D Parikh
(74) *Attorney, Agent, or Firm* — Banner & Witcoff, Ltd.

(57) ABSTRACT

Encoding and/or decoding a block of a video frame may be based on previously decoded reference information in the frame. A weighted sum of the reference information may be used as a prediction of the block for encoding and/or decoding the block. The weights to be applied for determining the weighted sum may be based on weights that most accurately predict neighboring, template samples of the block.

20 Claims, 24 Drawing Sheets

(56) References Cited

OTHER PUBLICATIONS

JVET-C0061, Joint Video Exploration Team (JVET) of ITU-T SG 16 WP 3 and ISO/IEC JTC 1/SC 29/WG 11 3rd Meeting: Geneva, CH, May 26-Jun. 1, 2016, Source: InterDigital Communications Inc., Title: Decoder-side intra mode derivation.
JVET-O0449-v2, Joint Video Experts Team (JVET) of ITU-T SG 16 WP 3 and ISO/IEC JTC 1/SC 29/WG 11 15th Meeting: Gothenburg, SE, Jul. 3-12, 2019, Source: ATEME, British Broadcasting Corporation, Title: Non-CE3: Decoder-side Intra Mode Derivation with Prediction Fusion Using Planar.
JVET-U0048, Joint Video Experts Team (JVET) of ITU-T SG 16 WP 3 and ISO/IEC JTC 1/SC 29 21st Meeting, by teleconference, Jan. 6-15, 2021, Source: InterDigital, Title: Evaluation of Template Matching Prediction for VVC.
JVET-V0098-v2, Joint Video Experts Team (JVET) of ITU-T SG 16 WP 3 and ISO/IEC JTC 1/SC 29 22nd Meeting, by teleconference, Apr. 20-28, 2021, Source: Bytedance Inc., Title: EE2-related: Template-based intra mode derivation using MPMs.
JVET-V0130-v6, Joint Video Experts Team (JVET) of ITU-T SG 16 WP 3 and ISO/IEC JTC 1/SC 29 22nd Meeting, by teleconference, Apr. 20-28, 2021, Source: InterDigital, Title: EE2: Intra Template Matching.
JVET-W0053-v1, Joint Video Experts Team (JVET) of ITU-T SG 16 WP 3 and ISO/IEC JTC 1/SC 29 23rd Meeting, by teleconference, Jul. 7-16, 2021, Source: Bytedance Inc., Title: EE2-2.1: Results for template-based intra mode derivation using MPMs.
JVET-W0123-v2, Joint Video Experts Team (JVET) of ITU-T SG 16 WP 3 and ISO/IEC JTC 1/SC 29 23rd Meeting, by teleconference, Jul. 7-16, 2021, Source: Qualcomm Incorporated, Bytedance Inc., Title: EE2-related: Fusion for template-based intra mode derivation.
JVET-Y2002-v1, Joint Video Experts Team (JVET) of ITU-T SG 16 WP 3 and ISO/IEC JTC 1/SC 29 25th Meeting, by teleconference, Jan. 12-21, 2022, Source: Editors, Title: Algorithm description for Versatile Video Coding and Test Model 16 (VTM16).
JVET-Y2025-v2, Joint Video Experts Team (JVET) of ITU-T SG 16 WP 3 and ISO/IEC JTC 1/SC 29 23rd Meeting, by teleconference, Jul. 7-16, 2021, Source: Editors, Title: Algorithm description of Enhanced Compression Model 4 (ECM 4).
Pfaff et al., "Data-driven intra-prediction modes in the development of the versatile video coding standard," ITU Journal: ICT Disvoeries, vol. 3(1), May 18, 2020.
Yi Guo, Ye-Kui Wang, Houqiang Li, "Priority-Based Template Matching Intra Prediction", 978-1-4244-2571-6/08/$25.00 ©2008 IEEE.
Jonathan Pfaff, et al. "3834 IEEE Transactions on Circuits and Systems for Video Technology, vol. 31, No. 10, Oct. 2021", IEEE Transactions on Circuits and Systems for Video Technology, vol. 31, No. 10, Oct. 2021.
JVET-Y2002-v1, JVET 25th Meeting, Jan. 12-21, 2022, Source: Editors, Title: Algorithm description for Versatile Video Coding and Test Model 16 (VTM16).
JVET-Y2025-v2, JVET 23rd Meeting, Jul. 7-16, 2021, Source: Editors, Title: Algorithm description of Enhanced Compression Model 4 (ECM 4).
JVET-AA0121-v2, JVET 27th Meeting, Jul. 13-22, 2022, Source: OPPO, Xidian University, Title: Non-EE2: Template-based MIP.
JVET-C0061, JVET 3rd Meeting, May 26-Jun. 1, 2016, Source: InterDigital Communications Inc., Title: Decoder-side Intra mode derivation.
Sep. 1, 2023—European Search Report—EP App. No. 23168437.4.

* cited by examiner

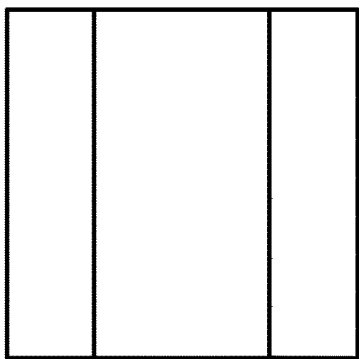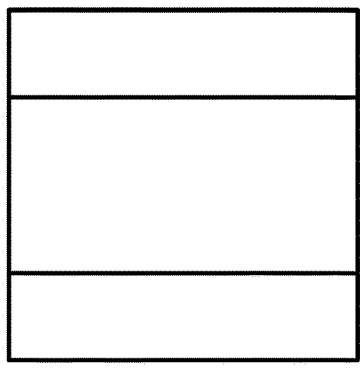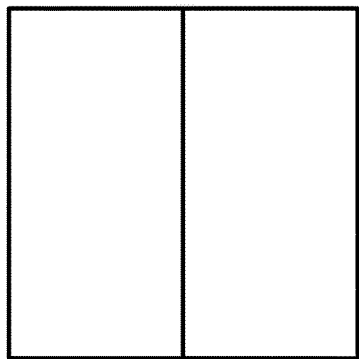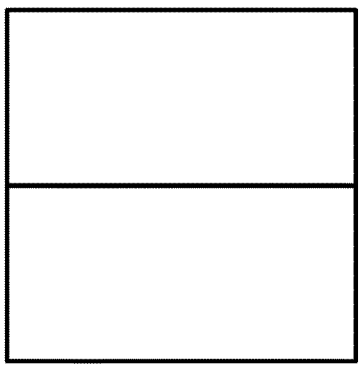
FIG. 6

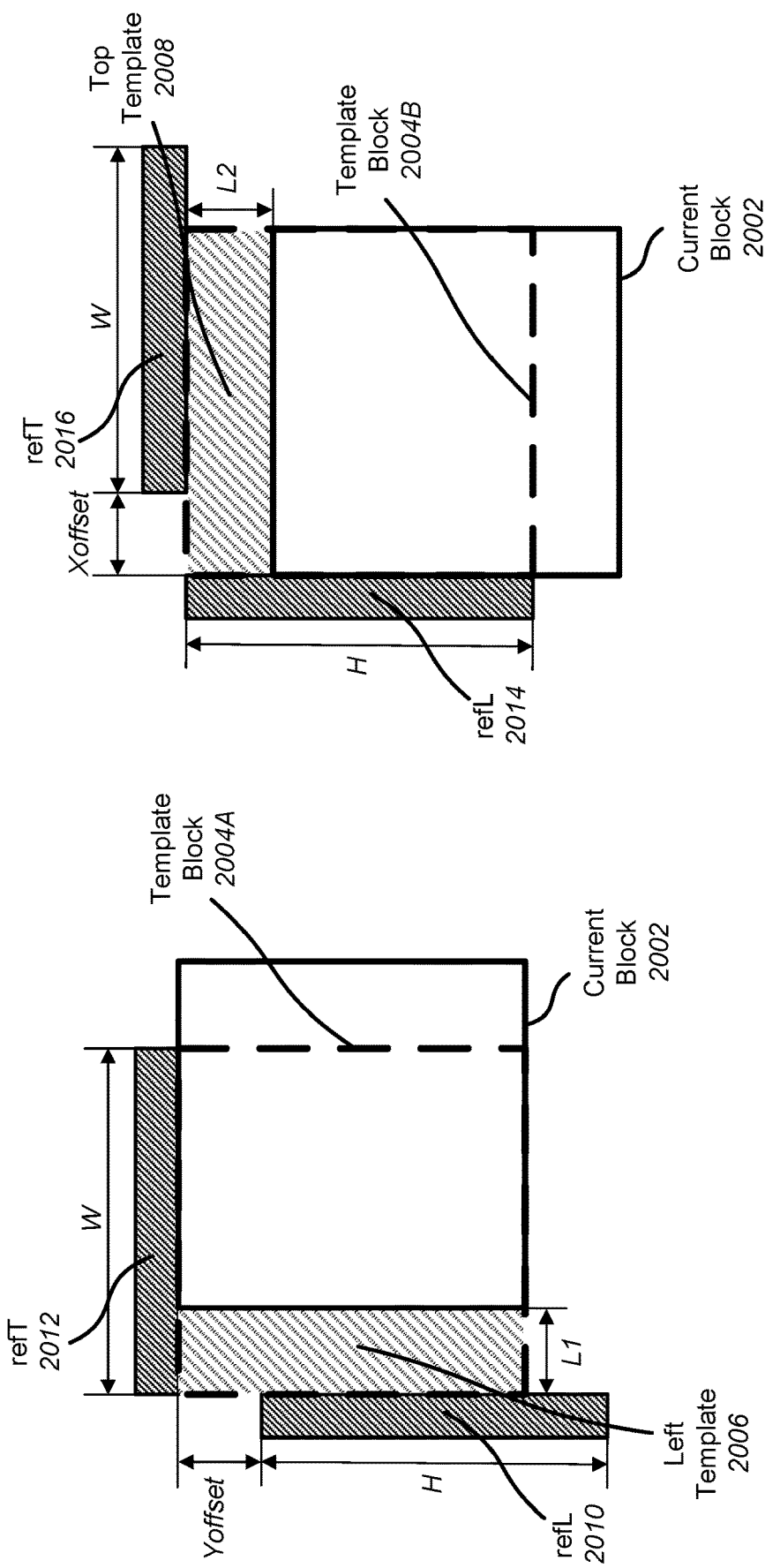

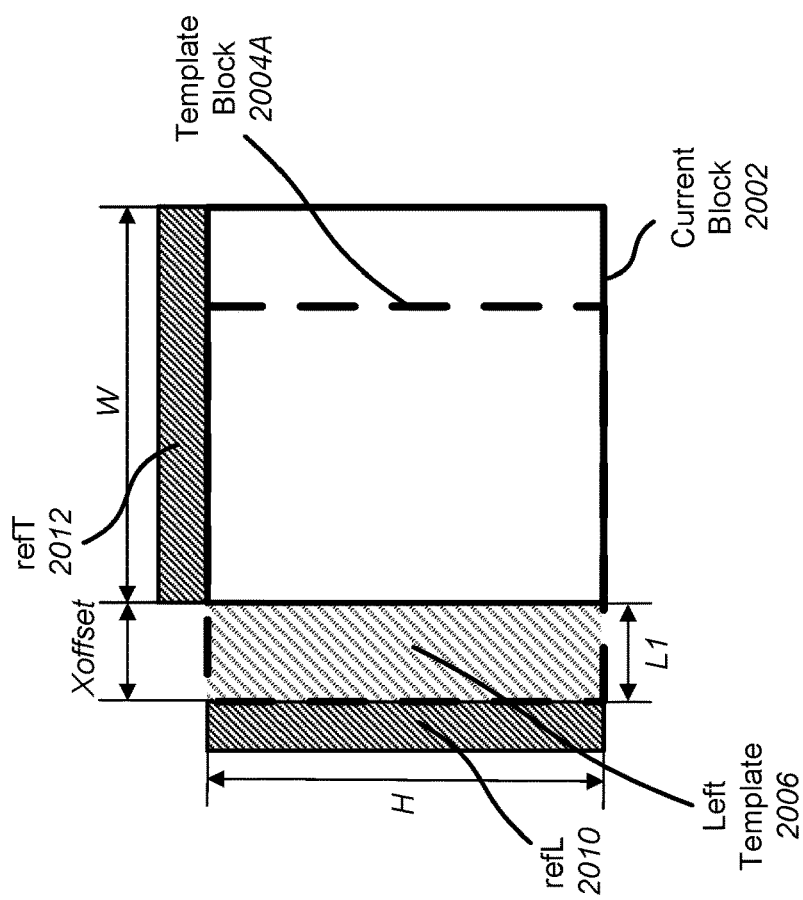
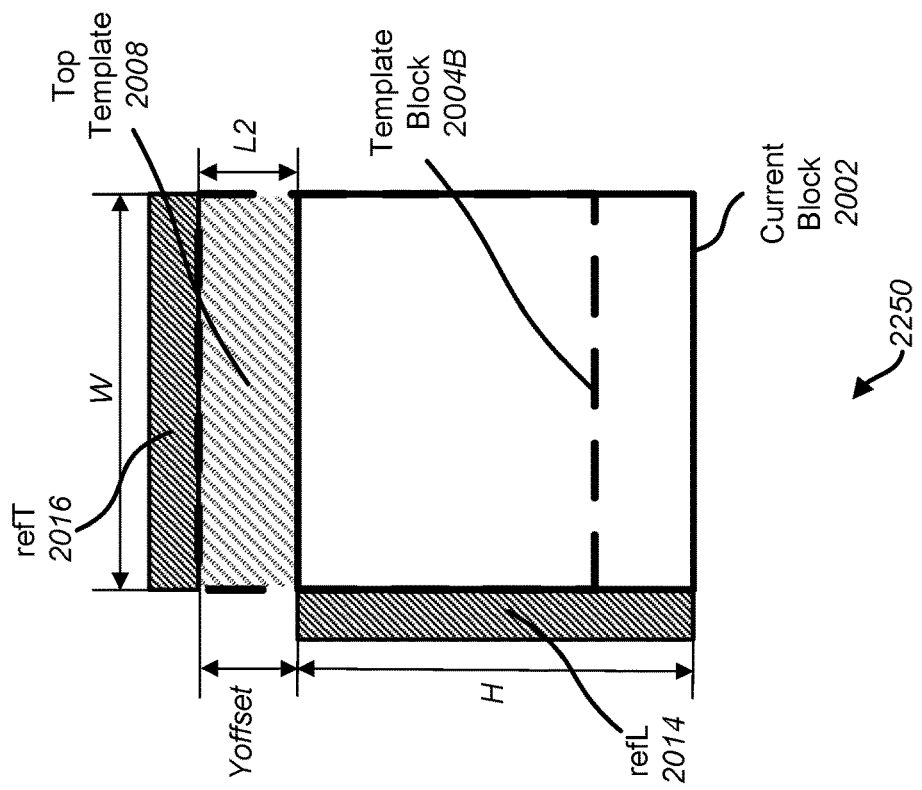
FIG. 22A
FIG. 22B

VIDEO COMPRESSION USING TEMPLATE-BASED DETERMINATION OF INTRA PREDICTION MODE

CROSS-REFERENCE TO RELATED APPLICATIONS

This application claims the benefit of U.S. Provisional Application No. 63/332,028 filed on Apr. 18, 2022. The above referenced application is hereby incorporated by reference in its entirety.

BACKGROUND

A computing device processes video for storage, transmission, reception, and/or display. Processing a video comprises encoding and decoding, for example, to reduce a data size associated with the video.

SUMMARY

The following summary presents a simplified summary of certain features. The summary is not an extensive overview and is not intended to identify key or critical elements.

A video may comprise a sequence of frames displayed consecutively. Predictive encoding and decoding may involve the use of information associated with samples, within a frame, to encode and/or decode other blocks of samples in the same frame. Information associated with one or more blocks (e.g., luma and/or chroma components of the blocks) may be encoded using previously decoded information associated with reference samples in the same frame. For example, a weighted sum of information associated with the reference samples may be used as a prediction of a block to be encoded and/or decoded, and a prediction error may be determined (e.g., at an encoder) based on the prediction of the block and actual information of the block. The prediction error and the weighted sum may be used, at a decoder, to decode the block. Weights to be applied for determining the weighted sum may be selected based on weights that most accurately predict (e.g., based on corresponding reference samples) neighboring samples (e.g., template samples) of the block. Determination of weights based on the neighboring samples may result in an encoder not needing to separately signal the weights for decoding the block, which may provide advantages such as improved coding efficiency and/or reduced signaling overhead.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6 shows example binary tree and ternary tree partitions.
FIG. 21A and FIG. 21B show an example of a template-based MIP mode derivation.
FIG. 22A and FIG. 22B show an example of a template-based MIP mode derivation.

DETAILED DESCRIPTION

Figure 1:
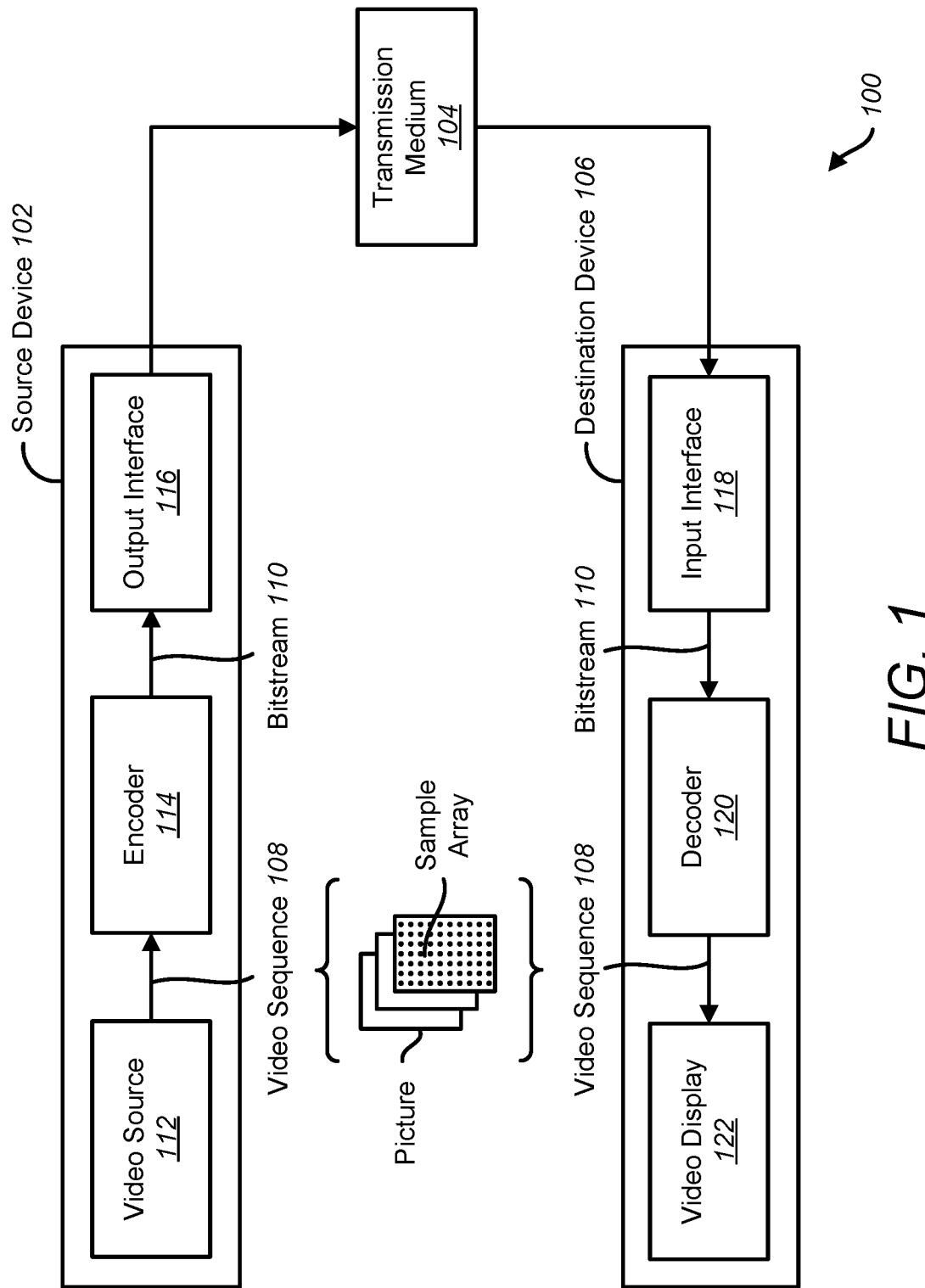
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
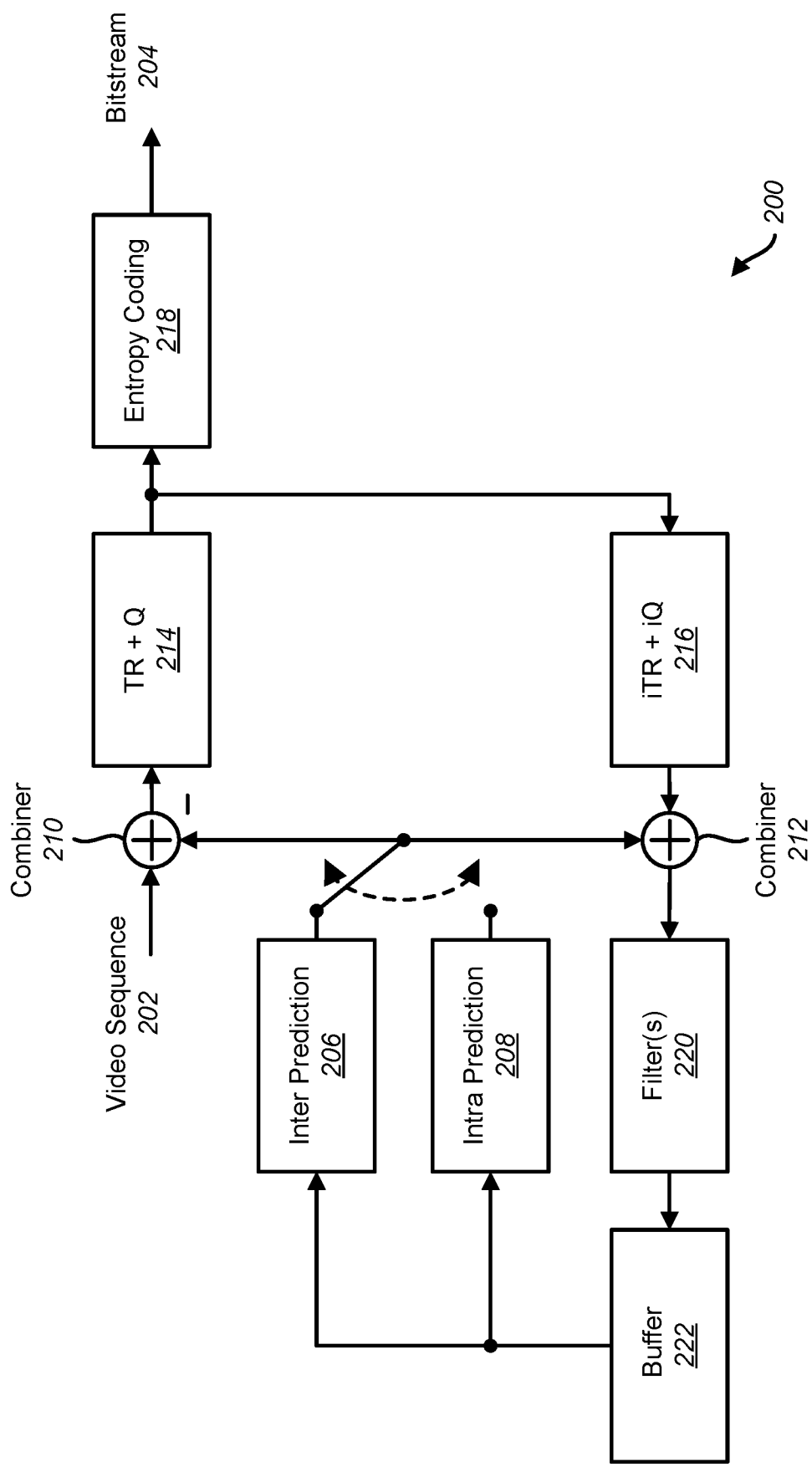
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
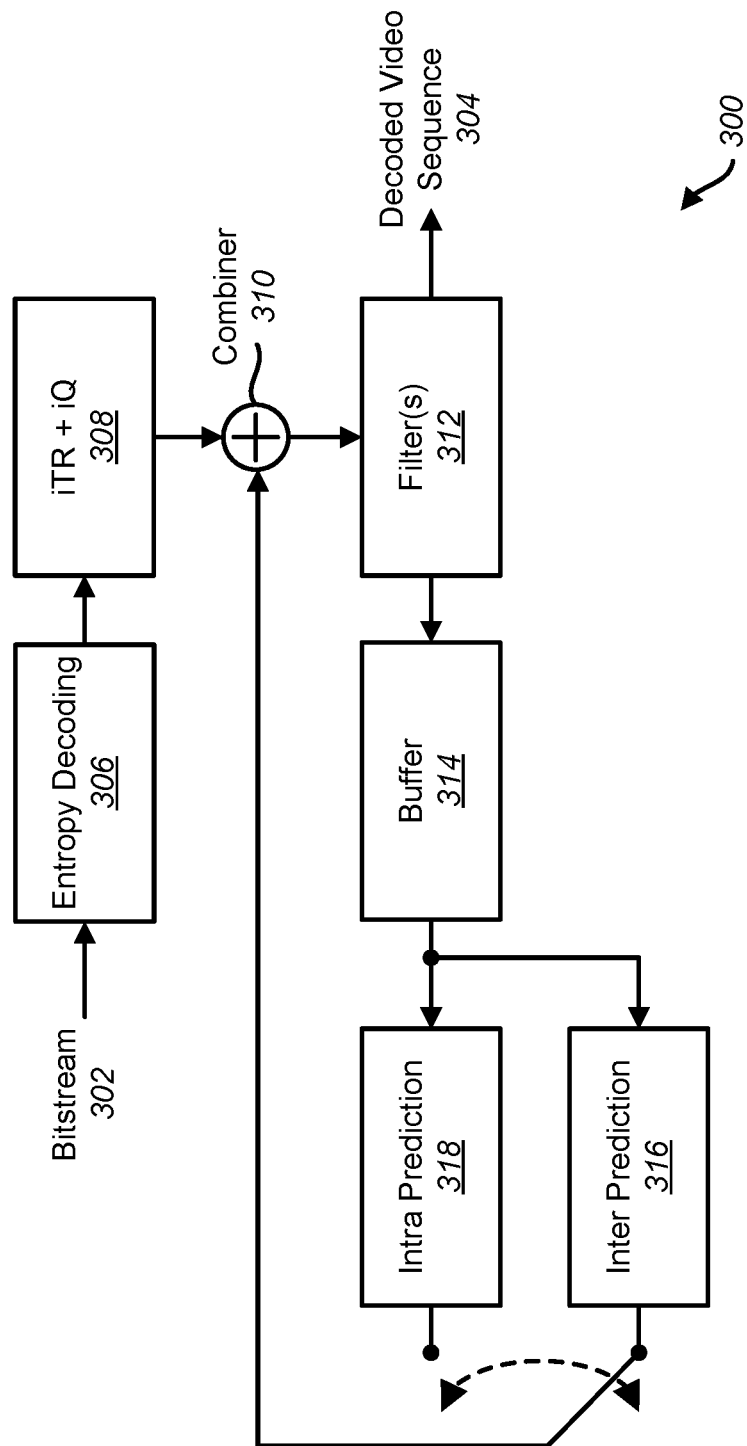
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of $2^n \times 2^n$ samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
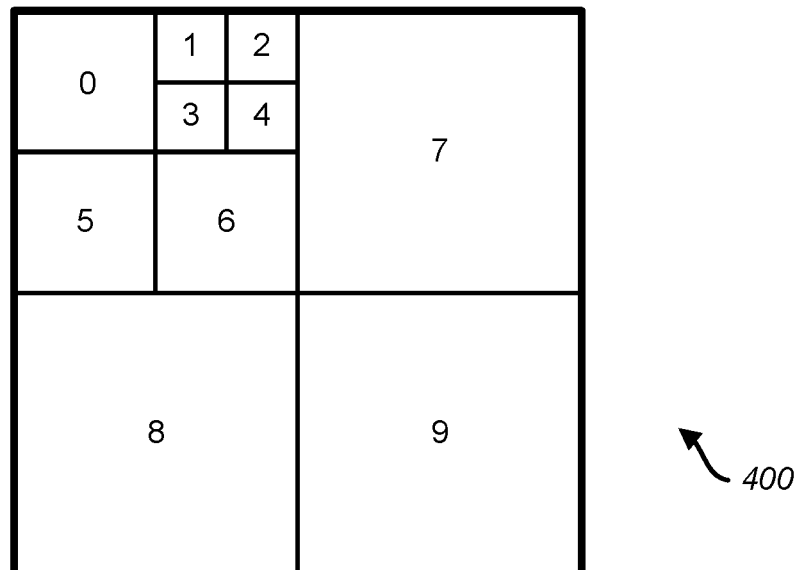
FIG. 4 shows an example quadtree partitioning of a coding tree block (CTB).
Figure 5:
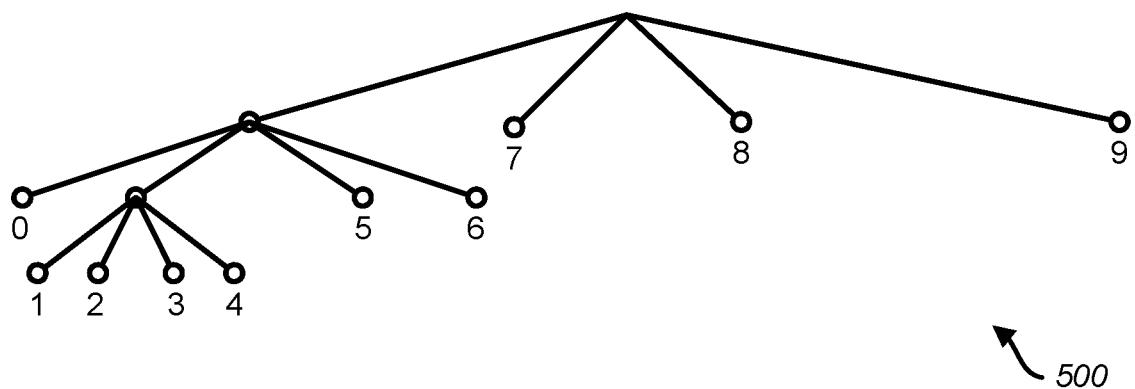
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
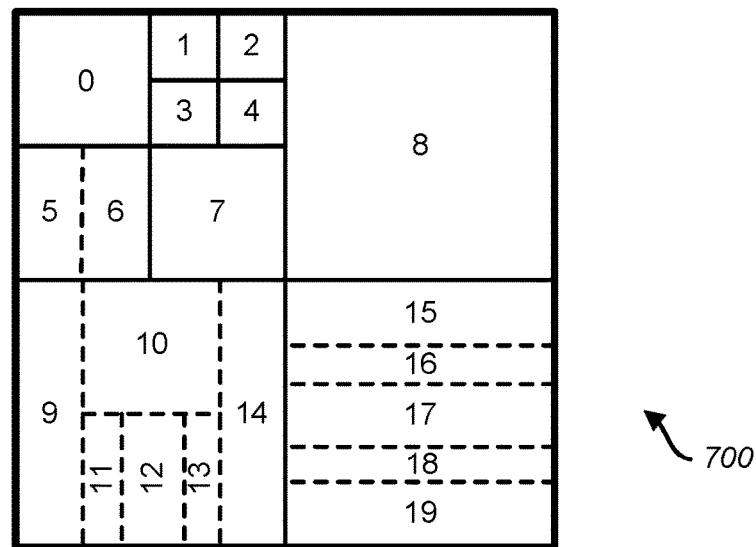
FIG. 7 shows an example of combined quadtree and multi-type tree partitioning of a CTB.
Figure 8:
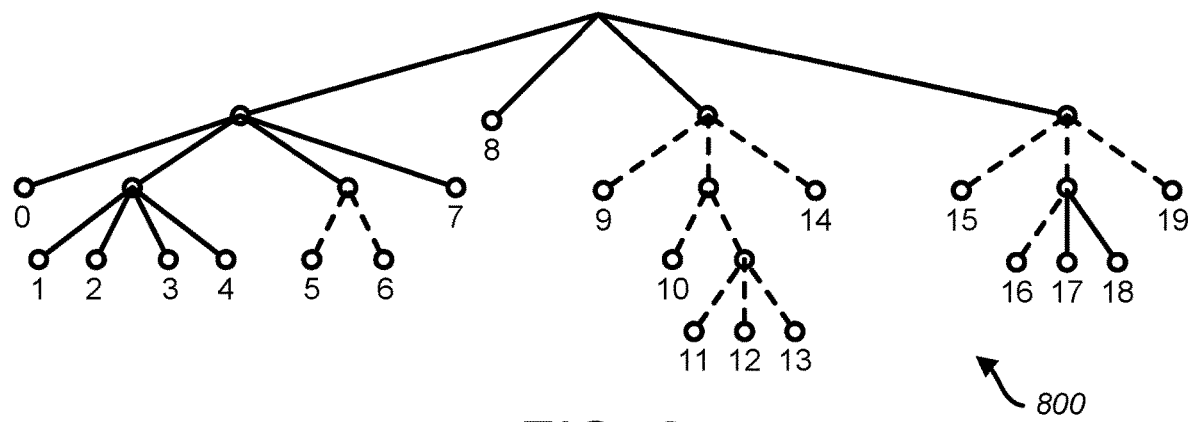
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
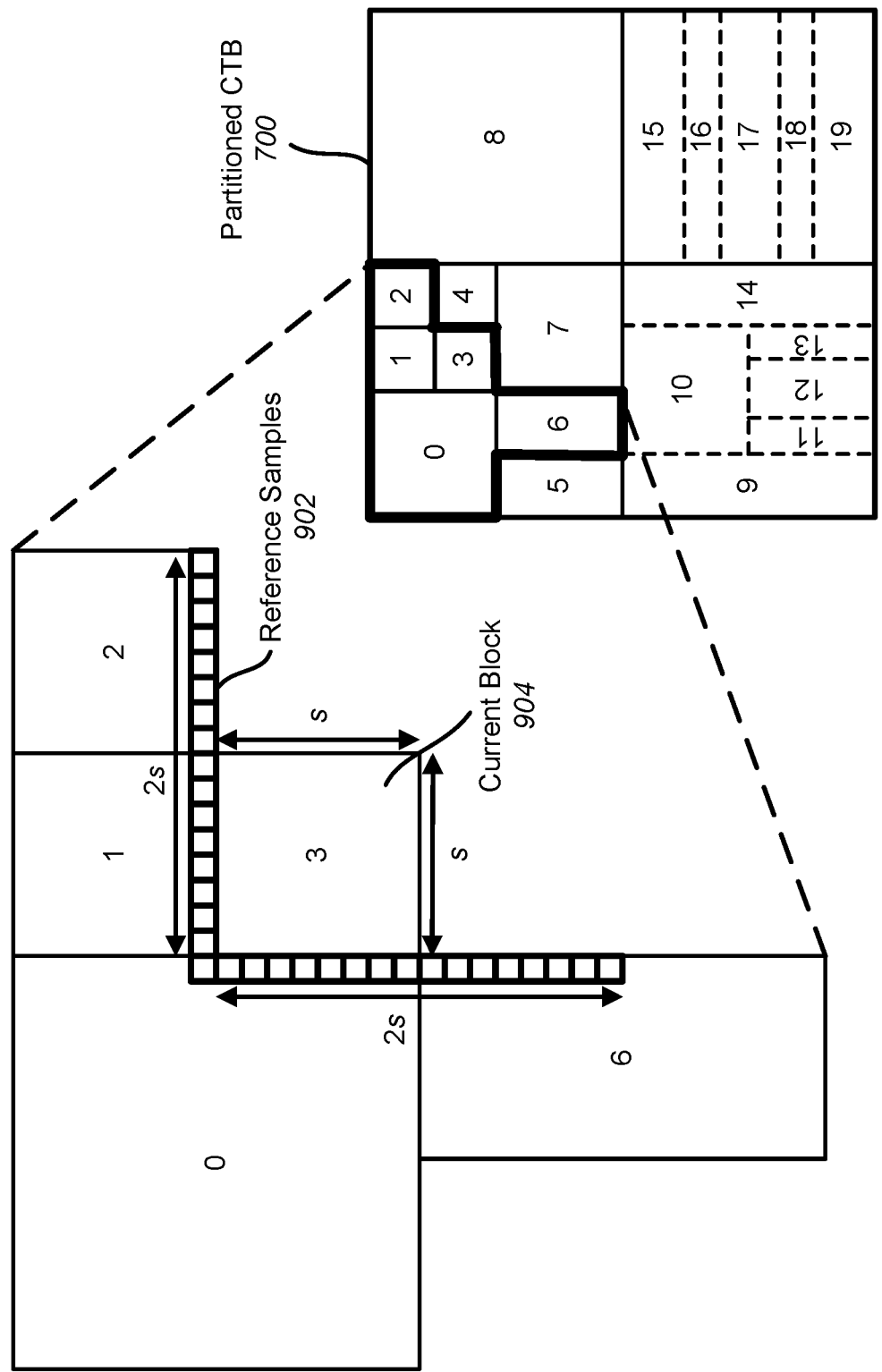
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2h samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
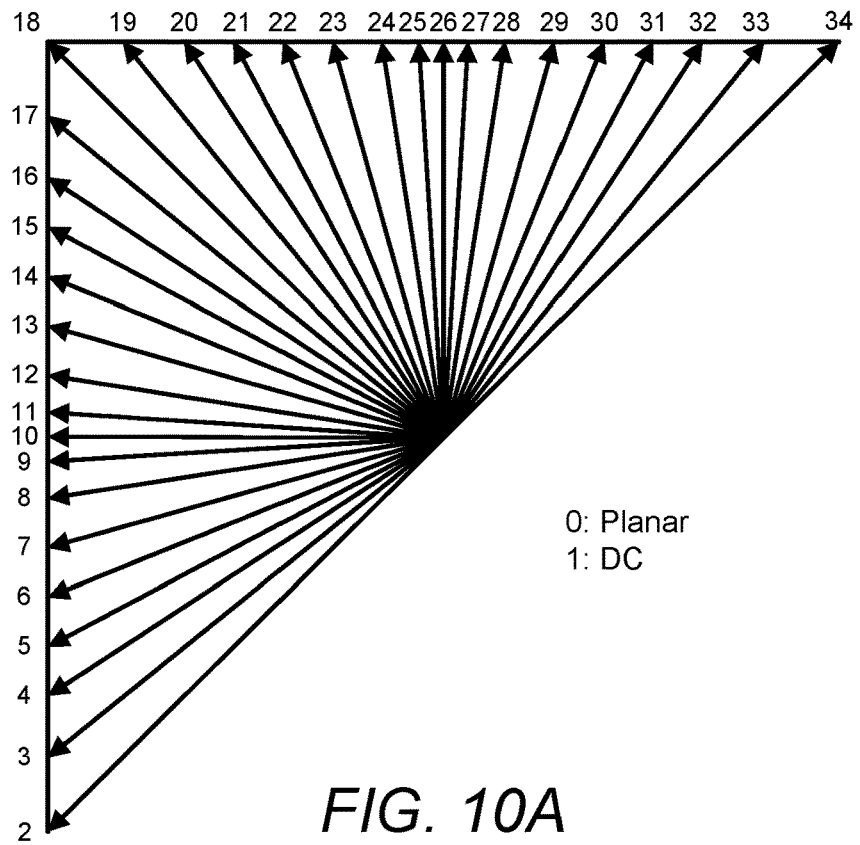
FIGS. 10A and 10B show example intra prediction modes.
Figure 10B:
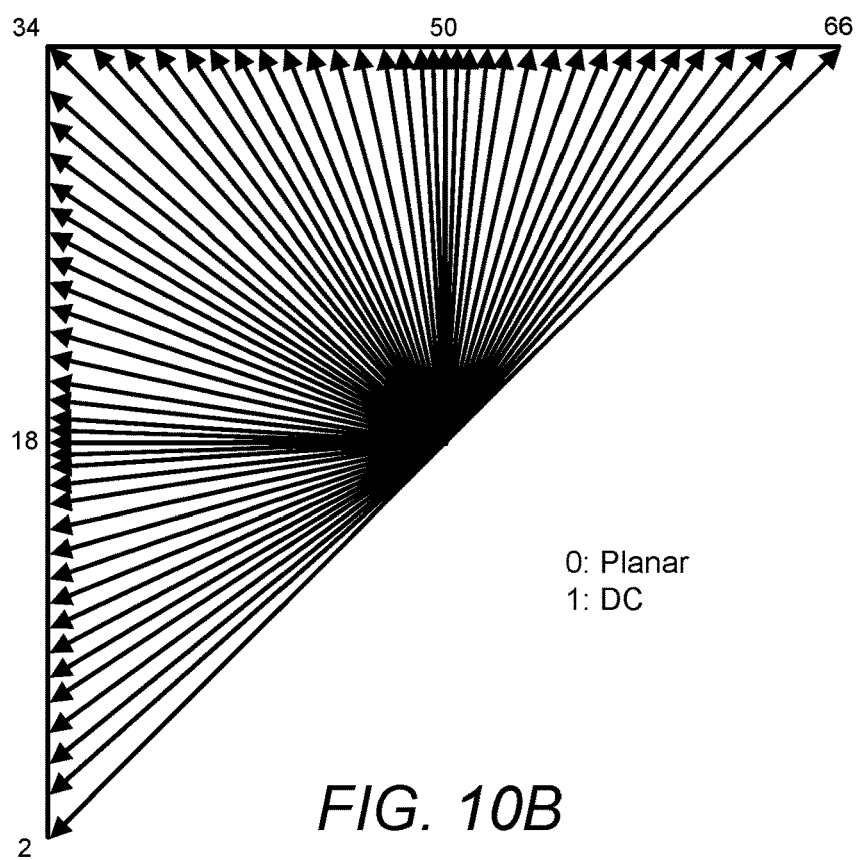

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
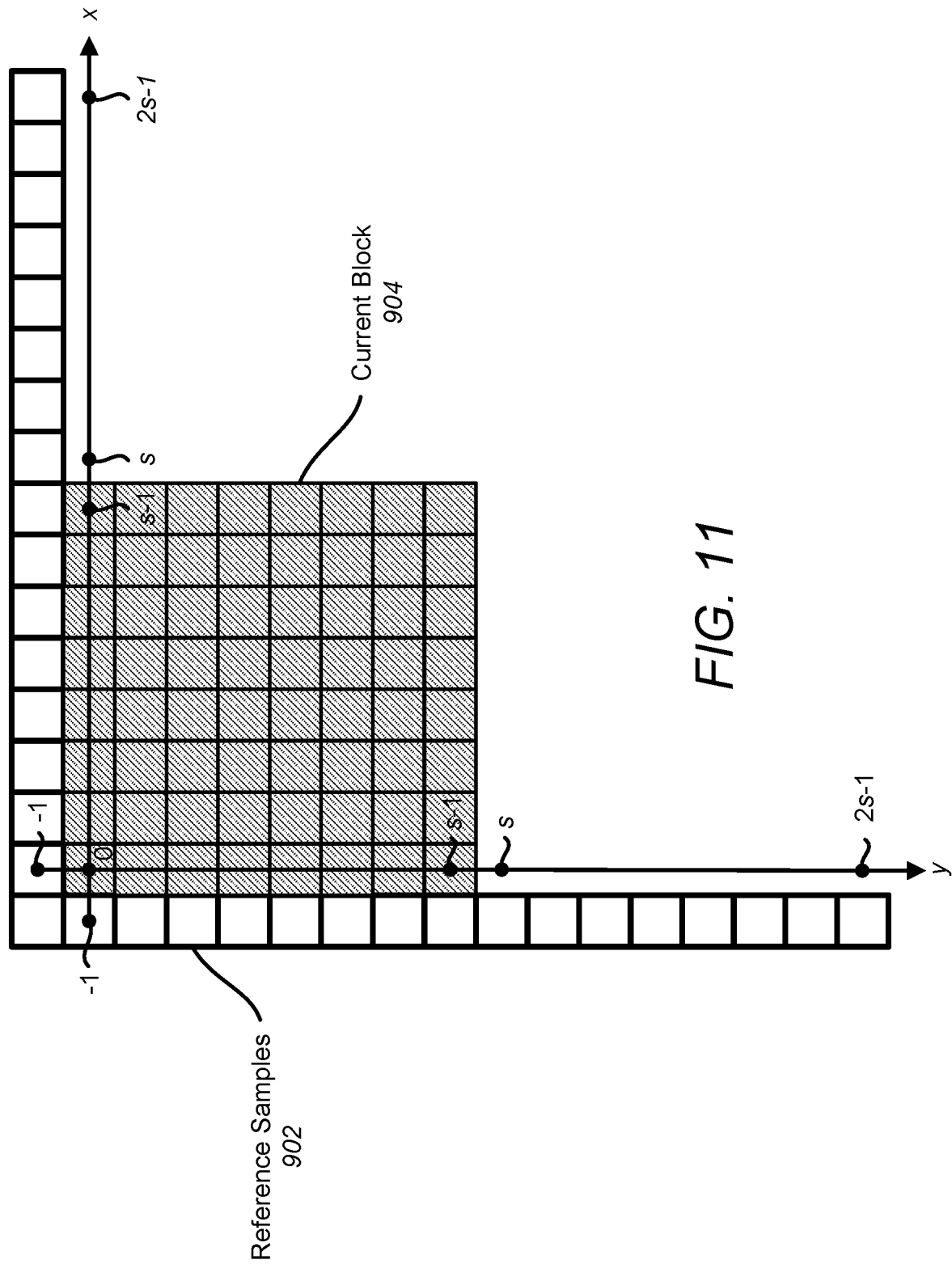
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array $ref_1[x]$:

$$ref_1[x]=p[-1+x][-1], (x \geq 0). \tag{1}$$

The reference samples 902 to the left of the current block 904 may be placed in the one-dimensional array $ref_2[y]$:

$$ref_2[y]=p[-1][-1+y], (y \geq 0). \tag{2}$$

The prediction process may comprise determination of a predicted sample p[x][y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2 \cdot s}(h[x][y] + v[x][y] + s), \tag{3}$$

where $$h[x][y]=(s-x-1) \cdot ref_2[y]+(x+1) \cdot ref_1[s] \tag{4}$$

may be the horizontal linear interpolation at the location [x][y] in the current block 904 and $$v[x][y]=(s-y-1) \cdot ref_1[x]+(y+1) \cdot ref_2[s] \tag{5}$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p[x][y] in the current block 904 may be determined/calculated as:

$$p[x][y] = \frac{1}{2 \cdot s}\left(\sum_{x=0}^{s-1}ref_1[x] + \sum_{y=0}^{s-1}ref_2[y]\right). \tag{6}$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
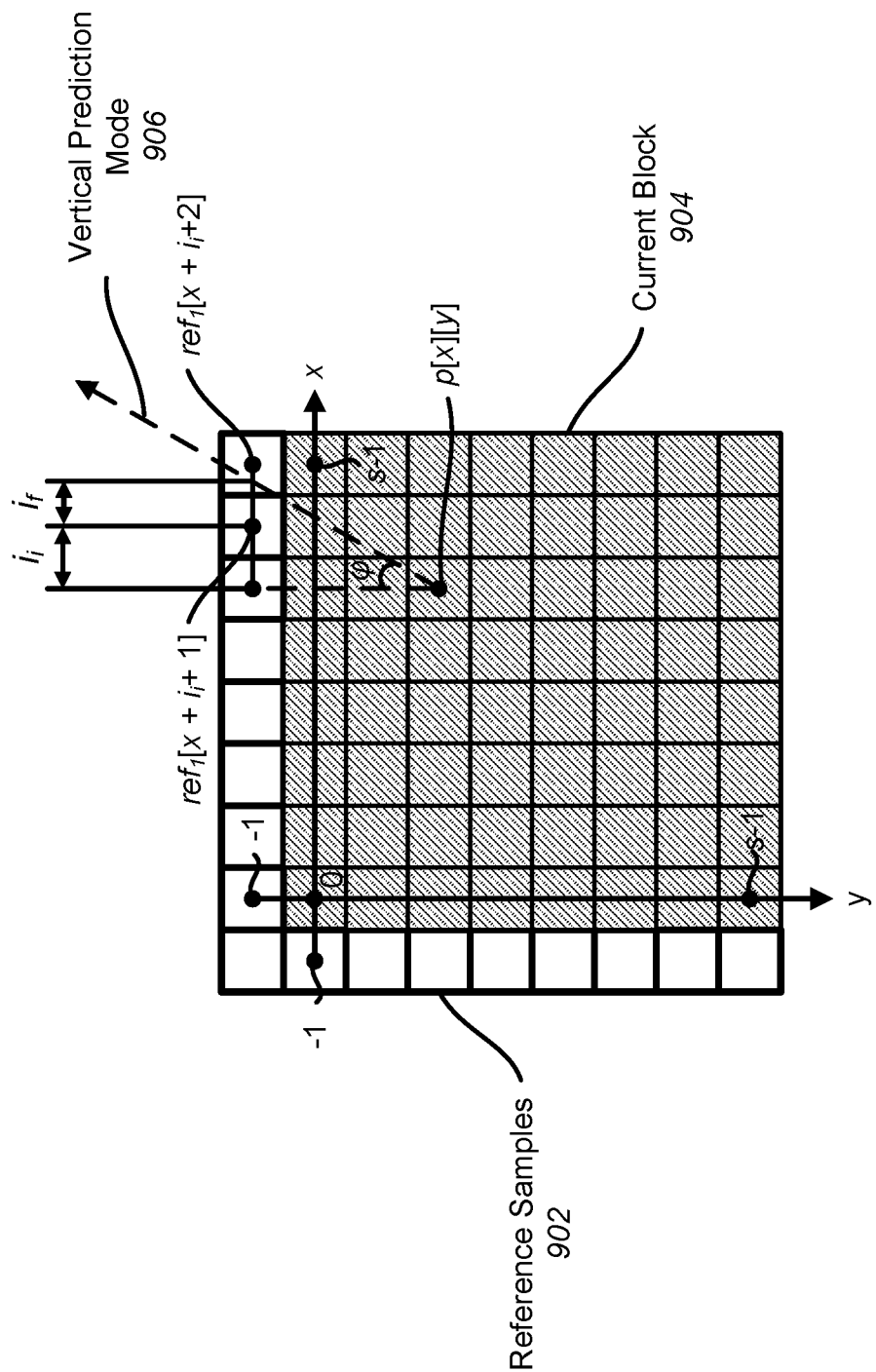
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples $ref_1[x]$. The reference samples 902 are only partially shown in FIG. 12 for ease of illustration. As shown in FIG. 12, the projection point on the horizontal line of reference samples $ref_1[x]$ may not be exactly on a reference sample. A predicted sample p[x][y] in the current block 904 may be determined/calculated by linearly interpolating between the two reference samples, for example, if the projection point falls at a fractional sample position between two reference samples. The predicted sample p[x][y] may be determined/calculated as:

$$p[x][y]=(1-i_f)\cdot ref_1[x+i_i+1]+i_f\cdot ref_1[x+i_i+2]. \quad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i=\lfloor(y+1)\cdot\tan\varphi\rfloor. \quad (8)$$

$i_f$ may be the fractional part of the horizontal displacement of the projection point relative to the location [x][y] and may be determined/calculated as:

$$i_f=((y+1)\cdot\tan\varphi)-\lfloor(y+1)\cdot\tan\varphi\rfloor, \quad (9)$$

where $\lfloor\cdot\rfloor$ is the integer floor function.

A location [x][y] of a sample in the current block 904 may be projected onto the vertical line of reference samples $ref_2[y]$, such as for horizontal prediction modes. A predicted sample p[x][y] for horizontal prediction modes may be determined/calculated as:

$$p[x][y]=(1-i_f)\cdot ref_2[y+i_i+1]+i_f\cdot ref_2[y+i_i+2]. \quad (10)$$

$i_i$ may be the integer part of the vertical displacement of the projection point relative to the location [x][y]. $i_i$ may be determined/calculated as a function of the tangent of the angle φ of the horizontal prediction mode as:

$$i_i=\lfloor(x+1)\cdot\tan\varphi\rfloor. \quad (11)$$

$i_f$ may be the fractional part of the vertical displacement of the projection point relative to the location [x][y]. $i_f$ may be determined/calculated as:

$$i_f=((x+1)\cdot\tan\varphi)-\lfloor(x+1)\cdot\tan\varphi\rfloor, \quad (12)$$

where $\lfloor\cdot\rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y]=\sum_{i=0}^{3}fT[i]\cdot ref_1[x+iIdx+i], \quad (13)$$

where fT[i], i=0 . . . 3, may be the filter coefficients, and Idx is integer displacement. A predicted sample p[x][y], for horizontal prediction modes, may be determined based on the four-tap FIR filter as:

$$p[x][y]=\sum_{i=0}^{3}fT[i]\cdot ref_2[y+iIdx+i]. \quad (14)$$

Supplementary reference samples may be determined/constructed if the location [x][y] of a sample in the current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in $ref_2[y]$ in the vertical line of reference samples 902 to the horizontal line of reference samples 902 using the negative vertical prediction angle φ. Supplementary reference samples may be similarly determined/constructed, for example, if the location [x][y] of a sample in the current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in $ref_1[x]$ on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
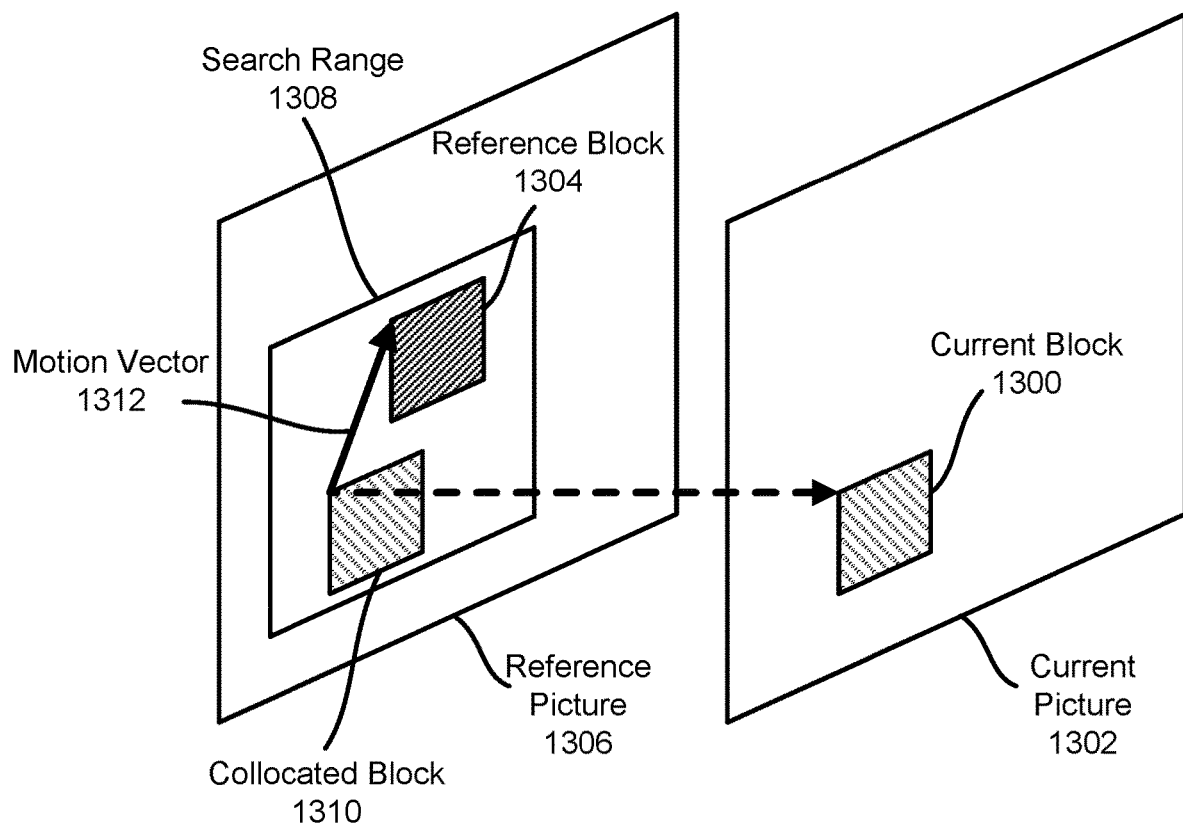
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
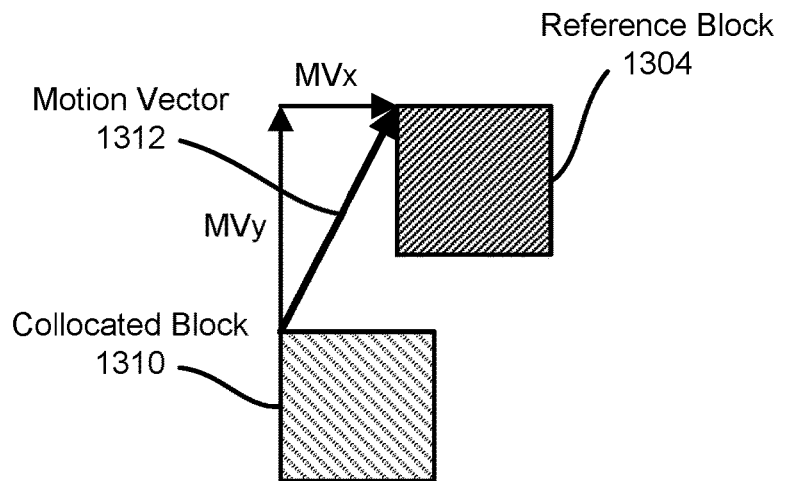
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component ($MV_x$) and a vertical component ($MV_y$) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have ½, ¼, ⅛, 1/16, 1/32, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
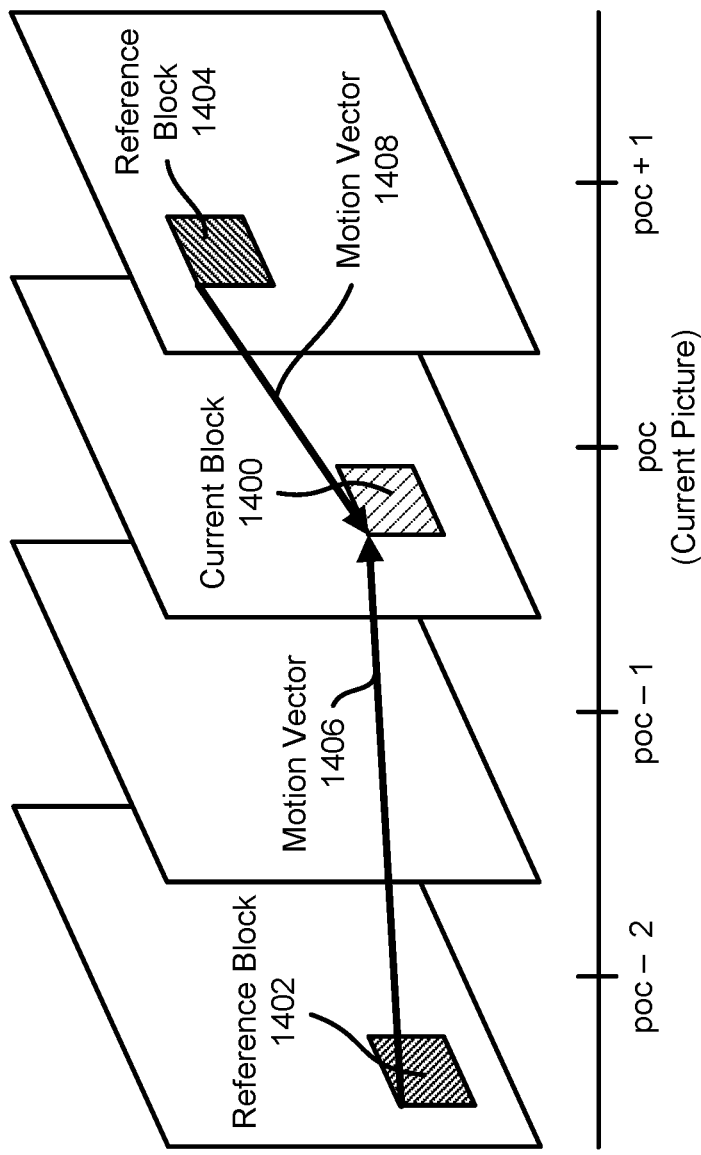
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component ($MV_x$) and a vertical component ($MV_y$)) relative to a position of the current block being coded, the MVD may be represented by two components $MVD_x$ and $MVD_y$. $MVD_x$ and $MVD_y$ may be determined/calculated as:

$$MVD_x = MV_x - MVP_x, \quad (15)$$

$$MVD_y = MV_y - MVP_y. \quad (16)$$

$MVD_x$ and $MVD_y$ may respectively represent horizontal and vertical components of the MVD. $MVP_x$ and $MVP_y$ may respectively represent horizontal and vertical components of the MVP. A decoder (e.g., the decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
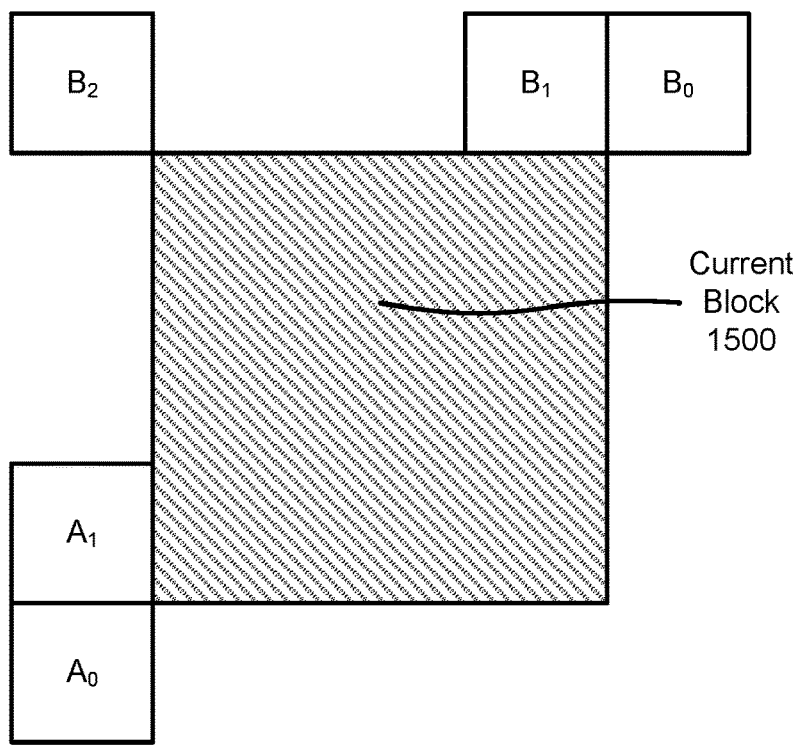
FIG. 15A shows example spatial candidate neighboring blocks for a current block.
Figure 15B:
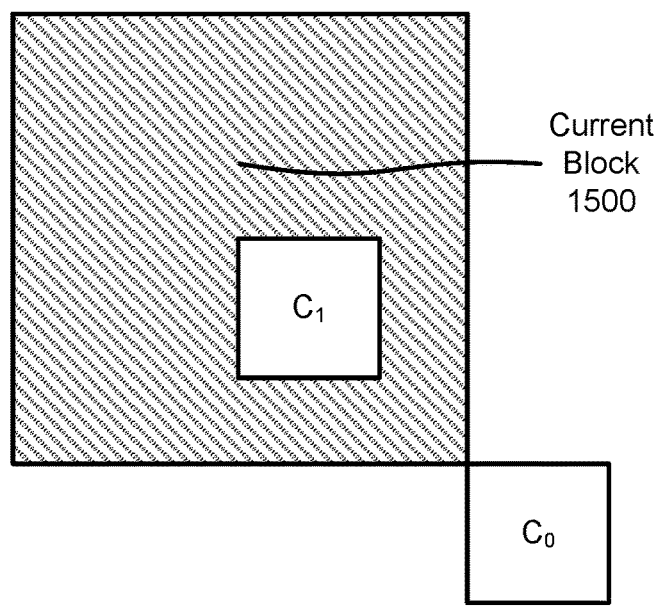
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be $A_0, A_1, B_0, B_1$, and $B_2$. FIG. 15B shows temporal, co-located blocks for the current block. For example, two (or any other quantity of) temporal, co-located blocks may be located relative to the current block 1500. The two temporal, co-located blocks may be $C_0$ and $C_1$. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks $A_0, A_1, B_0, B_1$, and $B_2$) for inter prediction of a current block. The encoder (e.g., using merge mode) may reuse the same motion information of a temporal, co-located block (e.g., one of temporal, co-located blocks $C_0$ and $C_1$) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

Figure 16:
FIG. 16 shows an example of intra block copy (IBC) for encoding.

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate the selected BVP in the list of candidate BVPs. The BVD may be determined/calculated based on a difference between a BV of the current block and the selected BVP. For example, for a BV that indicates a position (e.g., represented by a horizontal component ($BV_x$) and a vertical component ($BV_y$)) relative to a position of the current block being coded, the BVD may represented by two components $BVD_x$ and $BVD_y$. $BVD_x$ and $BVD_y$ may be determined/calculated as:

$$BVD_x = BV_x - BVP_x, \quad (17)$$

$$BVD_y = BV_y - BVP_y. \quad (18)$$

$BVD_x$ and $BVD_y$ may respectively represent horizontal and vertical components of the BVD. $BVP_x$ and $BVP_y$ may respectively represent horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks for IBC may be respectively denoted $A_0$, $A_1$, $B_0$, $B_1$, and $B_2$.

An encoder (e.g., the encoder 200 as shown in FIG. 2) and/or a decoder (e.g., the decoder 300 as shown in FIG. 3) may use intra prediction to generate a prediction of a current block being encoded. Intra prediction may generate a prediction signal based on already reconstructed samples of the same frame of the current block. The prediction signal may be generated by intra prediction methods (e.g., an angular intra prediction mode, a DC prediction mode, and/or a planar mode).

Intra prediction modes may be designed using data-driven methods (e.g., matrix-based intra prediction (MIP) modes). Intra prediction modes designed using data driven methods may be integrated into any coding standard, format, and/or protocol (e.g., in HEVC, VVC, and/or other video coding standards/formats/protocols). The MIP modes may be considered for inclusion into an enhanced compression model (ECM) software algorithm. The ECM may be currently under coordinated exploration study by the Joint Video Exploration Team (JVET) of ITU-T Video Coding Experts Group (VCEG) and/or ISO/IEC MPEG as a potential enhanced video coding technology beyond the capabilities of VVC.

Figure 17:
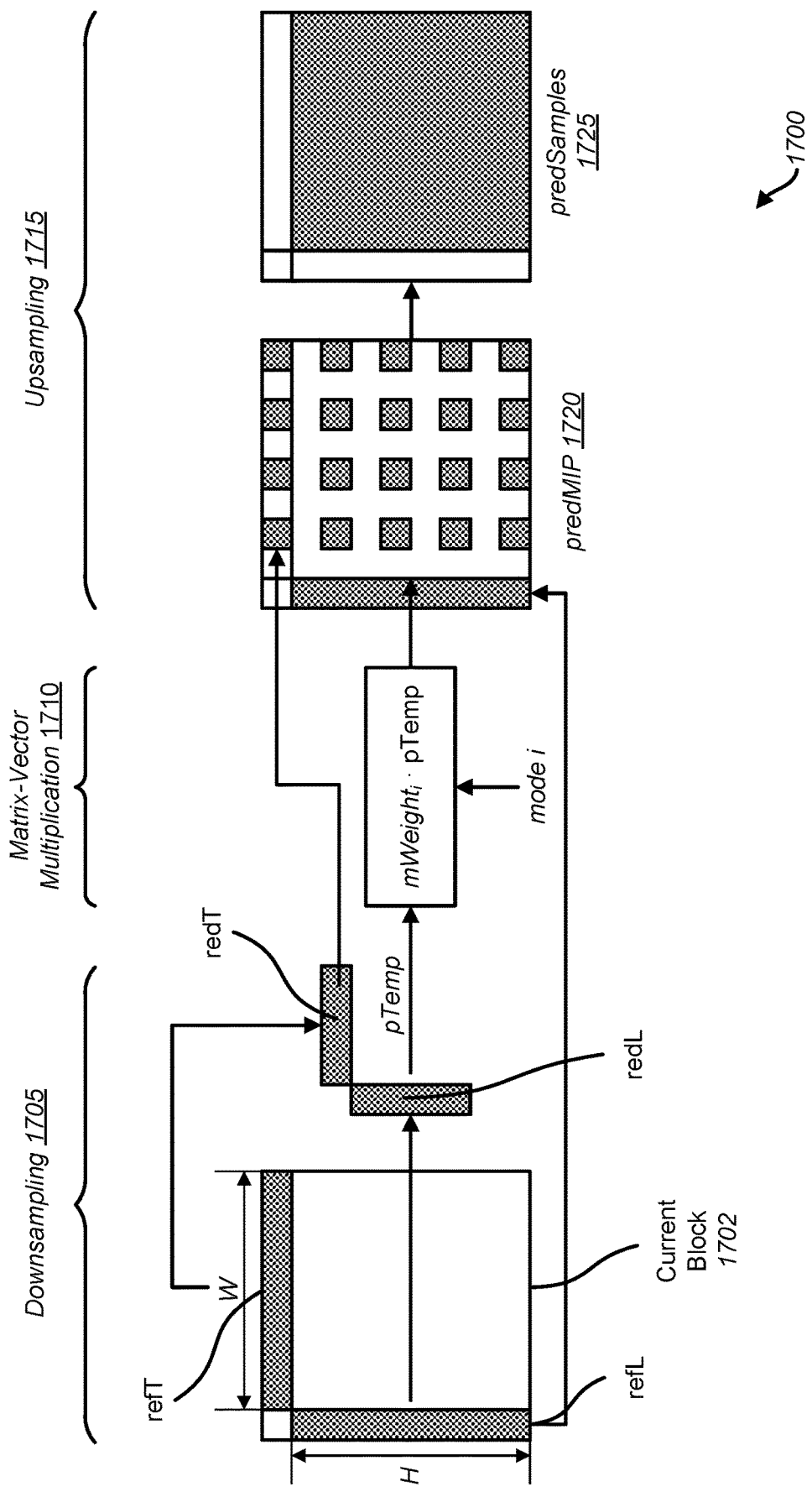
FIG. 17 shows an example of matrix-based intra prediction (MIP).

FIG. 17 shows an example of matrix-based intra prediction (MIP). The MIP 1700 may be performed by an encoder (e.g., the encoder 200 in FIG. 2) and/or a decoder (e.g., the decoder 300 in FIG. 3). The MIP 1700 may include one or more steps. The MIP 1700 may include one or more of downsampling 1705, matrix-vector multiplication 1710, upsampling 1715, and/or any other additional steps/processes. In some scenarios, downsampling 1705 and/or upsampling 1715 may be omitted.

Samples of a current block 1702 to be coded (e.g., encoded or decoded) may be predicted from reference samples (e.g., samples previously encoded and reconstructed at an encoder, and decoded at a decoder) taken from a column to the left of the current block 1702 (e.g., the column immediately adjacent to the left-most column of the current block 1702) and/or reference samples taken from a row above the current block 1702 (e.g., the row immediately adjacent to the top-most row of the current block 1702). The samples from the column to the left of the current block 1702 may be left reference samples (e.g., refL) and the samples from the row above the current block 1702 may be top reference samples (e.g., refT). The current block 1702 may be W×H samples in size. The top reference samples refT may extend over W samples of the row above the current block 1702 and/or the left reference samples refL may extend over H samples of the column to the left of the current block 1702. The top reference samples refT may extend over more or less samples of the row above the current block 1702 and/or the left reference samples refL may extend over more or less samples of the column to the left of the current block 1702. The dimensions W and/or H may be integer powers of two (or any other quantity). W and H may be integer powers of two (e.g., between 4 and 64, or may be any other quantity).

Samples available from neighboring blocks of the current block 1702 may be used to determine/construct the left reference samples refL and/or the top reference samples refT. In some scenarios, samples may not be available for determining/constructing the left reference samples refL and the top reference samples refT. Samples may not be available for determining/constructing the left reference samples refL and the top reference samples refT, for example, if the samples lie outside the picture of the current block 1702, the samples are part of a different slice or CTU of the current block 1702, and/or the samples belong to blocks that have been inter coded and constrained intra prediction is indicated. Intra prediction may not be dependent on inter predicted blocks, for example, if the constrained intra prediction is indicated (e.g., configured for encoding and/or decoding). Samples that may not be available for determining and/or constructing the left reference samples refL and/or the top reference samples refT may include samples in blocks that have not already been encoded and decoded at an encoder and/or decoded at a decoder based on the sequence order for encoding/decoding. Samples available for determining/constructing the left reference samples refL and/or the top reference samples refT may be reconstructed samples. Using reconstructed samples for determining/constructing the left reference samples refL and/or the top reference samples refT may allow identical prediction results to be determined at both the encoder and the decoder.

Samples unavailable for determining/constructing the left reference samples refL and/or the top reference samples refT may be filled with available samples of the left reference samples refL and/or the top reference samples refT. Samples unavailable for determining/constructing the left reference samples refL and/or the top reference samples refT may be filled with a nearest available sample of the left reference samples refL and/or the top reference samples refT. Samples unavailable for determining/constructing the left reference samples refL and/or the top reference samples refT may be filled with a nearest available sample, of the left reference samples refL and/or the top reference samples refT, determined, for example, by moving in a clock-wise direction through the left reference samples refL and/or the top reference samples refT from the position of the unavailable sample. If no samples are available, the left reference samples refL and/or the r top reference samples efT may be filled with the mid-value of the dynamic range of the picture of the current block 1702 being coded.

The encoder and/or the decoder performing the MIP 1700 may perform downsampling of the left reference samples refL and/or the top reference samples refT. The encoder and/or the decoder performing the MIP 1700 may perform downsampling of the left reference samples refL and/or the top reference samples refT, for example, after the left reference samples refL and/or the top reference samples refT are constructed/determined. Downsampling of the left reference samples refL and/or the top reference samples refT may generate/determine downsampled reference samples that may be referred to as reduced left reference samples (e.g., redL) and/or reduced top reference samples (e.g., redT), respectively. The downsampling of the left reference samples refL and/or the top reference samples refT may reduce the quantity of samples in the left reference samples refL and/or the top reference samples refT. Reducing the quantity of samples may advantageously reduce the quantity of operations (e.g., multiplications) needed to perform matrix-vector multiplication 1710. The quantities of reduced left reference samples redL and/or the reduced top reference samples redT may be based on the dimensions of the current block 1702. For example, the reduced left reference samples redL and/or the reduced top reference samples redT may each consist of 2 samples based on the current block 1702 having dimensions W=4 and H=4. The reduced left reference samples redL and/or the reduced top reference samples redT may each consist of 4 samples. The reduced left reference samples redL and/or the reduced top reference samples redT may each consist of 4 samples, for example, based on the current block 1702 having any other dimensions. The reduced left reference samples redL and/or the reduced top reference samples redT may each consist of more or less samples depending on the dimensions of the current block 1702. The left reference samples refL and/or the top reference samples refT may each consist of more or less samples depending on the dimensions of the current block 1702.

The encoder and/or the decoder may generate/determine the reduced left reference samples redL and/or the reduced top reference samples redT. The encoder and/or the decoder may generate/determine the reduced left reference samples redL and/or the reduced top reference samples redT, for example, by averaging sets of reference samples in the left reference samples refL and/or the top reference samples refT, respectively. For example, the encoder and/or the decoder may generate/determine, if the current block 1702 has dimensions W=4 and H=4, the reduced left reference samples redL according to the following equation:

$$redL[i] = \left(\left(\sum_{j=0}^{1} refL[i \cdot 2 + j]\right) + 1\right) \gg 1, \text{ for } 0 \le i < 2. \quad (19)$$

Otherwise, the encoder and/or the decoder may generate/determine the reduced left reference samples redL according to the following equation:

$$redL[i] = \left(\left(\sum_{j=0}^{2^k-1} refL[i \cdot 2^k + j]\right) + (1 \ll (k-1))\right) \gg k, \text{ for } 0 \le i < 4, \quad (20)$$

where the width of the current block 1702 is given by W=4·$2^k$. The encoder and/or the decoder may generate/determine the reduced top reference samples redT in an analogous manner to equations (19) and (20) for the reduced left reference samples redL.

The encoder and/or the decoder may concatenate the reduced left reference samples redL and the reduced top reference samples redT. The encoder and/or the decoder may concatenate the reduced left reference samples redL and the reduced top reference samples redT, for example, to generate/determine a concatenated vector of downsampled reference samples (e.g., pTemp=[redL, redT]). For example, for the current block 1702 having dimensions W=4 and H=4, the concatenated vector of downsampled reference samples pTemp may have a size of 4. Otherwise, the concatenated vector of downsampled reference samples pTemp may have a size of 8 (or any other quantity).

The encoder and/or the decoder may perform matrix-vector multiplication 1710 to determine and/or generate a prediction of the current block 1702. The prediction of the current block may be a reduced sample prediction of the current block 1702 (e.g., predMIP 1720). The encoder and/or decoder may determine/generate predMIP 1720 by determining/calculating a matrix vector product:

$$\text{predMIP} = m\text{Weight}_i \cdot p\text{Temp}, \quad (21)$$

where mWeight$_i$ is a weight matrix of the i-th MIP mode. For example, the weight matrix mWeight$_i$ may comprise Wred·Hred rows and a quantity of columns. The quantity of columns may be equal to 4 (e.g., if W=H=4), or 8 in all other instances. Wred and Hred may be determined/calculated as:

$$Wred = \begin{cases} 4, & \text{for max}(W, H) \le 8 \\ \min(W, 8), & \text{for max}(W, H) > 8 \end{cases} \quad (22)$$

$$Hred = \begin{cases} 4, & \text{for max}(W, H) \le 8 \\ \min(W, 8), & \text{for max}(W, H) > 8 \end{cases} \quad (23)$$

Each term in predMIP 1720 may be determined/generated based on a linear combination of the reference samples in the concatenated vector of downsampled reference samples pTemp weighted by a respective set of weights (or row of weights) in the weight matrix mWeight$_i$. The terms in predMIP 1720 may correspond to a prediction of a respective sample of current block 1702.

The encoder and/or the decoder may select the weight matrix mWeight$_i$ from one of a plurality of sets of weight matrices. For example, the plurality of sets of weight matrices may comprises three sets of weight matrices—set S0, set S1, and set S2. The encoder and/or the decoder may select the weight matrix mWeight$_i$ based on a variable (e.g., parameter mipSizeId). The encoder and/or the decoder may determine mipSizeId. The encoder and/or the decoder may determine mipSizeId, for example, based on the dimensions W and H of the current block 1702. For instance, the encoder and/or the decoder may determine/calculate the variable mipSizeId as:

$$mipSizeId = \begin{cases} 0, \text{ for } W = H = 4 \\ 1, \text{ for } \max(W, H) = 8 \\ 2, \text{ for } \max(W, H) > 8 \end{cases} \quad (24)$$

The encoder and/or the decoder may select the weight matrix mWeight$_i$ from the set S0 based on the variable mipSizeId=0. The encoder and/or the decoder may select the weight matrix mWeight$_i$ from the set S0 based on the current block 1702 having dimensions of 4×4 (e.g., W=H=4). The set S0 may comprise 16 different weight matrices mWeight$_i$, i∈{0, ..., 15} (or any other quantity of weight matrices). Each of the 16 different weight matrices mWeight$_i$, i∈{0, ..., 15} may include 16 rows and 4 columns. The encoder and/or the decoder may select the weight matrix mWeight$_i$ from set S1 based on the variable mipSizeId=1 or based on the current block 1702 having dimensions of 4×8, 8×4, or 8×8 (e.g., max (W, H)=8). The set S1 may comprise 8 different weight matrices mWeight$_i$, i∈{0, ..., 7} (or any other quantity of weight matrices). Each of the 8 different weight matrices mWeight$_i$, i∈{0, ..., 7} may include 16 rows and 8 columns. The encoder and/or the decoder may select the weight matrix mWeight$_i$ from the set S2 based on the variable mipSizeId=2 or based on the current block 1702 having a width or a height greater than 8 (e.g., max (W, H)>8). The set S2 may comprise 6 different weight matrices mWeight$_i$, i∈{0, ..., 5} (or any other quantity of weight matrices). Each of the 6 different matrices mWeight$_i$, i∈{0, ..., 5} may include 64 rows and 8 columns.

The weight matrices mWeight$_i$ in the sets S0, S1, and S2 may be represented by integers (e.g., 8-bit integers) to enable a more efficient hardware implementation. The encoder and/or the decoder may replace the concatenated vector of downsampled reference samples pTemp with the vector p. The vector p may be determined/calculated as:

$$p[0] = 2^{B-1} - pTemp[0], \quad (25)$$

$$p[i] = pTemp[i] - pTemp[0], \text{ for } i > 0. \quad (26)$$

B may be a bit depth. The encoder and/or the decoder may use the vector p in place of the concatenated vector of downsampled reference samples pTemp in equation (21) to determine/calculate/predMIP 1720.

The encoder and/or the decoder may use a transpose of the weight matrix mWeight$_i$, for example, for each of the weight matrix mWeight$_i$ in the sets S0, S1, and S2. The encoder and/or the decoder may determine/generate predMIP 1720 using the transpose of the weight matrix mWeight$_i$. The encoder and/or the decoder may interchange the reduced left reference samples redL and the reduced top reference samples redT in the concatenation of the reduced left reference samples redL and the reduced top reference samples redT to generate/determine the concatenated vector of downsampled reference samples pTemp, and then use the transpose of the weight matrix mWeight$_i$ to determine/generate predMIP 1720 (e.g., using equation (21)).

The encoder and/or the decoder may perform upsampling 1715 on predMIP 1720 (e.g., the reduced sample prediction of the current block 1702) to determine/generate a prediction of the current block 1702 (e.g., predSamples 1725). The prediction of the current block 1702, predSamples 1725, may comprise a predicted sample for each sample in the current block 1702. The encoder and/or the decoder may determine/generate predSamples 1725, for example, based on linear interpolation from predMIP.

The encoder may predict the samples of the current block 1702. The encoder may predict the samples of the current block 1702 (e.g., during encoding of the current block 1702) for a plurality of MIP modes i (e.g., as shown in FIG. 17). The encoder may predict the samples of the current block 1702, for example, for each weight matrix mWeight$_i$ of the MIP modes in one of the sets S0, S1, and S2 (e.g., including the transpose of each weight matrix mWeight$_i$ of the MIP modes in the one of the sets S0, S1, and S2). For each MIP mode applied, the encoder may determine/calculate a prediction error and/or a residual for the current block 1702 based on a difference (e.g., SSD, SAD, SATD, and/or any other difference) between the prediction samples determined for the MIP mode and the original samples of the current block 1702. The encoder may determine/select one of the MIP modes to encode the current block 1702. The encoder may determine/select one of the MIP modes to encode the current block 1702, for example, based on the determined prediction errors. The encoder may select an MIP mode i that results in the smallest prediction error and/or the smallest prediction residual for the current block 1702. The encoder may determine/select one of the MIP modes, to encode the current block 1702, based on a rate-distortion measure (e.g., Lagrangian rate-distortion cost) determined/calculated using the prediction errors and/or the residuals. The encoder may send/transmit an indication (e.g., a signal) of the selected MIP mode and its corresponding prediction error and/or residual to the decoder for decoding of the current block 1702. The encoder may further send/transmit an indication (e.g., a flag) that MIP is used to predict the current block 1702. This indication (e.g., a flag) may be separate from the indication (e.g., a signal) of the selected MIP mode. The encoder may send/transmit the above information (e.g., the indication of the selected MIP mode, the flag, and/or the prediction error) in a bitstream to the decoder.

The decoder may predict the samples of the current block 1702 (e.g., during decoding of the current block 1702) for the selected MIP mode (e.g., as shown in FIG. 17). The decoder may receive the indication (e.g., a signal) of the selected MIP mode i from the encoder for the current block 1702. The decoder may perform MIP based on the MIP mode indicated/signaled by the encoder for the current block 1702 and/or based on the indication (e.g., a flag) that MIP is used to predict the current block 1702 (e.g., separated from the indication (e.g., a signal) of the selected MIP mode). The decoder may add the predicted values of the samples of the current block 1702 (e.g., predSamples 1725) to the prediction error and/or the residual of the current block 1702 received from the encoder to reconstruct the current block 1702. The decoder may receive the above information (e.g., the indication of the selected MIP mode, the flag, and/or the prediction error) in a bitstream from the encoder.

An encoder may signal/send an MIP mode (e.g., the selected MIP mode), to encode a current block (e.g., the current block 1702). The encoder may signal the MIP mode, for example, using a binarization of the MIP mode index. The encoder may signal/send the MIP mode, selected among the MIP modes, to encode the current block using a fixed-length binarization of the MIP mode index and/or using an entropy encoding of the MIP mode index. The fixed-length binarization and/or the entropy encoding of the MIP mode index (e.g., based on the quantity of MIP modes available) may be up to 5 or more bits in length. A compression gain (e.g., achieved by removing redundant information for a block based on a selected MIP mode) may be reduced by this signaling overhead (e.g., the fixed-length binarization and/or the entropy encoding of the MIP mode index). The compression gain may be further reduced if a larger quantity of MIP modes is supported by a coding protocol. In some video coding standards (e.g., VVC or other video coding standards), a smaller list of most probable modes (MPMs) may be constructed at the encoder and/or the decoder to reduce the signaling overhead (e.g., of intra prediction mode). The encoder may signal/send a selected intra prediction mode using a smaller quantity of bits (e.g., 2 or 3 bits or other bits in length) based on the smaller size of the MPM list, for example, if the selected intra prediction mode is within the MPM list. The encoder may have to fall back to signaling a selected intra-prediction mode (e.g., using a fixed-length binarization and/or an entropy encoding of the MIP mode index), for example, if the selected mode is not in an MPM list, even if the MPM list is configured.

Signaling/sending the selected intra prediction mode may be avoided if an intra prediction mode (e.g., an MIP mode) is derived using other information/criteria. For example, the encoder and/or the decoder may use previously encoded/decoded samples (e.g., reconstructed samples) to derive/determine an intra prediction mode Techniques using previously encoded/decoded samples (such as, e.g., decoder-side intra mode derivation (DIMD) and template-based intra mode derivation (TIMD)) may be used for determining/deriving conventional intra prediction modes (e.g., angular intra prediction modes, DC, and planar) but may not be directly applied to determining/deriving MIP modes and/or may not accurately determine/derive an MIP mode for predicting a current block.

Various examples described herein may enable efficient indication/determining an MIP mode at an encoder and/or a decoder. An encoder and/or a decoder may determine costs (e.g., prediction error), where each of the costs may be a cost of (e.g., prediction error associated with) using a respective MIP mode among a plurality of MIP modes. A cost may be a cost of using an MIP mode to determine a prediction of a first template based on first reference samples and/or a prediction of a second template based on second reference samples. The first reference samples may be the same as the second reference samples. The first reference samples may be different than the second reference samples. An MIP mode may be selected from among the available MIP modes based on the costs. A prediction of a current block may be generated/determined based on the selected MIP mode.

Figure 18:
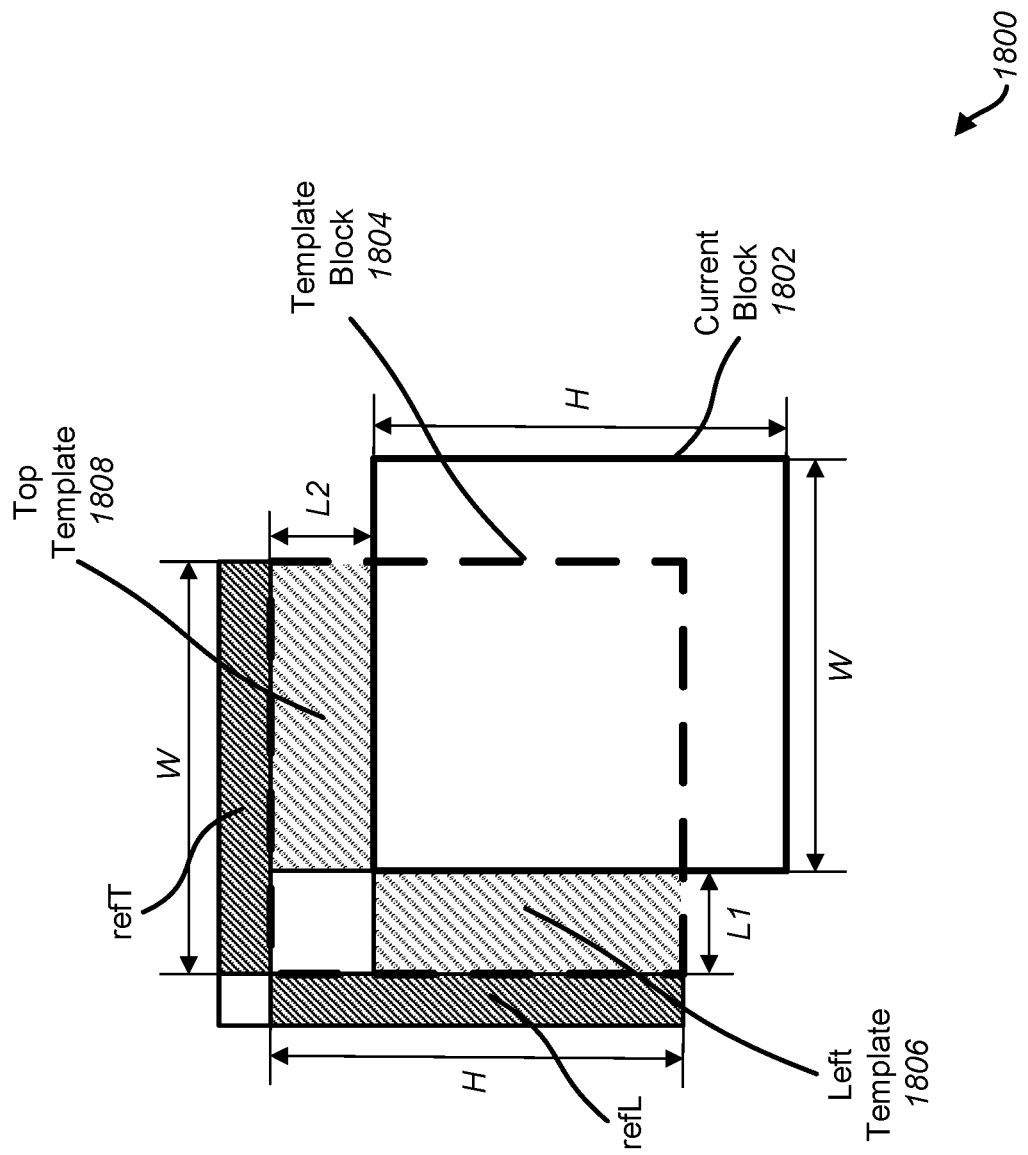
FIG. 18 shows an example of a template-based MIP mode derivation.

The encoder may indicate (e.g., in a bitstream) MIP mode determination for decoding the current block. The signal or indication may indicate, to a decoder, that the decoder may derive/determine the MIP mode for decoding the block (e.g., based on the prediction errors/costs). The signal or indication may be a flag, one-bit signal, and/or any other indication. Using only a flag, or a one-bit signal, to indicate an MIP mode may reduce a signaling overhead for MIP mode signaling and improve encoding efficiency FIG. 18 shows an example of template-based MIP mode derivation. An encoder (e.g., the encoder 200 as shown in FIG. 2) and/or a decoder (e.g., the decoder 300 as shown in FIG. 3) may implement a template-based MIP mode derivation 1800.

The encoder and/or the decoder may determine/derive an MIP mode (e.g., using the template-based MIP mode derivation 1800) for predicting a current block 1802. The template-based MIP mode derivation 1800 may use reconstructed neighboring samples of a current block 1802 (e.g., that are available at both the encoder and the decoder) to determine the MIP mode for predicting the current block 1802. The current block 1802 may be a block within a picture or a frame. The current block 1802 may be a coding block (CB) within a coding tree unit (CTU) of a picture or a frame. The encoder and/or the decoder may perform MIP (e.g., the MIP 1700 as shown in FIG. 17) for a template block 1804 (shown in dashed lines) to derive the MIP mode for the current block 1802. The template block 1804 may have the same dimensions as the current block 1802. The template block 1804 may be offset by a length of L1 samples (e.g., L1>0) to the left of the current block 1802 and/or offset by a length of L2 samples (e.g., L2>0) above the current block 1802. The encoder and/or the decoder may perform MIP (e.g., the MIP 1700 of FIG. 17) to determine predictions of two portions of the template block 1804. The two portions of the template block 1804 may comprise a first portion of the template block 1804 to the left of the current block 1802 (e.g., a left template 1806), and a second portion of the template block 1804 above the current block 1802 (e.g., a top template 1808). The left template 1806 and/or the top template 1808 may comprise reconstructed neighboring samples of the current block 1802. The left template 1806 may be located to the left of the current block 1802 and may not comprise samples above the current block 1802 (e.g., above the top left most sample of the current block 1802). The top template 1808 may be located above the current block 1802 and may not comprise samples to the left of the current block 1802 (e.g., to the left of the top left most sample of the current block 1802). The left template 1806 may comprise samples above the current block 1802. The top template 1808 may comprise samples to the left of the current block 1802.

The encoder and/or the decoder may predict/determine (e.g., as described with respect to FIG. 17) samples of the left template 1806 and the top template 1808 from reference samples taken from a column to the left of the template block 1804 (e.g., the column immediately adjacent to the left-most column of the template block 1804) and reference samples taken from a row above template block 1804 (e.g., the row immediately adjacent to the top-most row of template block 1804). The encoder and/or the decoder may predict (e.g., as described with respect to FIG. 17) samples of the left template 1806 from reference samples taken from a column to the left of the template block 1804 (e.g., the column immediately adjacent to the left-most column of the template block 1804). The encoder and/or the decoder may predict (e.g., as described with respect to FIG. 17) samples of the top template 1808 from reference samples taken from a row above the template block 1804 (e.g., the row immediately adjacent to the top-most row of the template block 1804). The samples from the column to the left of the template block 1804 may be left reference samples (e.g., refL). The samples from the row above the template block 1804 may be top reference samples (e.g., refT). The top reference samples refT may extend over W samples of the row above the template block 1804 and/or the left reference samples refL may extend over H samples of the column to the left of the template block 1804, for example, if the template block 1804 is of W×H samples in size. The top reference samples refT may extend over more or less samples of the row above the template block 1802 and/or the left reference samples refL may extend over more or less samples of the column to the left of the template block 1804. The dimensions W and/or H may be integer powers of two or any other size. W and/or H may be integer powers of two (e.g., between 4 and 64), or may have any other values.

The encoder and/or the decoder may perform the MIP (e.g., the MIP 1700 as shown in FIG. 17, steps such as downsampling, matrix-vector multiplication, and/or upsampling), for example, after the left reference samples refL and the top reference samples refT are constructed and/or determined. One or more of the steps of downsampling and/or upsampling may or may not be performed. The MIP may be used to determine and/or generate prediction samples only for the left template 1806 and/or the top template 1808 (e.g., as opposed to prediction samples for the entire area of the template block 1804). Each of the prediction samples may be determined/generated based on a linear combination of the reference samples (e.g., the left reference samples refL and/or the top reference samples refT). The reference samples (e.g., the left reference samples refL and/or the top reference samples refT) may be weighted by a respective set of weights (or row of weights) in an MIP weight matrix of an MIP mode. One or more of the sets of weights in an MIP weight matrix of an MIP mode may be eliminated (e.g., not used), for example, based on the one or more sets of weights being used to determine and/or generate a prediction of a sample that is outside of both the left template 1806 and the top template 1808. One or more of the sets of weights in an MIP weight matrix of an MIP mode may be eliminated (e.g., not used), for example, based on the one or more sets of weights being used to determine and/or generate a prediction of a sample that is not used, during the upsampling step of the MIP, to determine a sample that is inside one of the left template 1806 or the top template 1808.

The encoder and/or the decoder may determine a respective cost of (e.g., prediction error associated with) using a respective MIP mode, of a plurality of MIP modes. The encoder and/or the decoder may determine a respective cost of (e.g., prediction error associated with) using a respective MIP mode, of a plurality of MIP modes, for example, to determine/generate a prediction of the left template 1806 based on the reference samples (e.g., the left reference samples refL and/or the top reference samples refT). Additionally or alternatively, the encoder and/or the decoder may determine a respective cost of (e.g., prediction error associated with) using a respective MIP mode, of a plurality of MIP modes, for example, to determine/generate a prediction of the top template 1808 based on the reference samples (e.g., the left reference samples refL and/or the top reference samples refT). The encoder and/or the decoder may determine/generate a prediction of the left template 1806 and/or the top template 1808, for each of the plurality of MIP modes, from the reference samples (e.g., the left reference samples refL and/or the top reference samples refT). The encoder and/or the decoder may determine a prediction error or cost, for an MIP mode, based on a difference (e.g., SSD, SAD, SATD, and/or any other difference) between the prediction samples, determined for the MIP mode, and the reconstructed samples of the left template 1806 and/or the top template 1808. The encoder and decoder may determine/select an MIP mode from the plurality MIP modes. The encoder and decoder may determine/select an MIP mode from the plurality MIP modes, for example, based on the determined prediction errors or costs. The encoder and/or the decoder may determine/select an MIP mode from the plurality of MIP modes that results in the smallest prediction error or cost for the left template 1806 and/or the top template 1808. The determined/selected MIP mode may be a template-based MIP mode.

The encoder may determine one or more rate-distortion (RD) costs of encoding the current block 1802. The encoder may compare an RD cost of encoding the current block 1802 using the template-based MIP mode with RD costs of encoding the current block 1802 using other prediction modes (e.g., other intra and inter prediction modes). The encoder may select/determine an appropriate prediction mode to encode the current block 1802 based on the RD costs. The encoder may select/determine the prediction mode with a lowest RD cost.

The encoder may signal/transmit a template-based MIP mode derivation flag (e.g., a one-bit flag) indicating that a template-based MIP mode is the prediction mode used to encode the current block 1802, for example, if the encoder selects/determines the template-based MIP mode to encode the current block 1802. The encoder may not signal/transmit other syntax elements used to encode the intra prediction of the current block 1802 (e.g., an MPM flag, an MPM index, a binary code for a non-MPM intra prediction mode, and/or any other syntax element), for example, if the template-based MIP mode derivation flag is signaled/transmitted. Not signaling/transmitting the other syntax elements may improve encoding efficiency and reduce signaling overhead. The decoder may parse the template-based MIP mode derivation flag in a bitstream received from the encoder. The decoder may determine/derive a template-based MIP mode, for example, based on the template-based MIP mode derivation flag indicating that a template-based MIP mode is the selected intra prediction mode used to encode the current block 1802. The decoder may (e.g., independently) determine/derive a template-based MIP mode and predict the current block 1802, for example, if the template-based MIP mode derivation flag indicates that a template-based MIP mode is used to encode the current block 1802. Prediction errors, as determined for the current block 1802 based on the determined template-based MIP mode, may be determined/signaled by an encoder and used at a decoder for encoding/decoding the current block 1802 (e.g., in a manner as described with respect to FIG. 17).

The encoder and/or the decoder may use other selection criteria or cost criteria to select/determine an MIP mode from the plurality of MIP modes. The encoder and/or the decoder may select two MIP modes, from the plurality of MIP modes, that result in the first and the second smallest prediction errors/costs for the left template 1806 and/or the top template 1808 (e.g., template-based MIP mode derivation fusion). The encoder and/or the decoder may use the two MIP modes (e.g., with the first and the second smallest prediction errors/costs). The encoder and/or the decoder may predict the current block 1802 using each of the two MIP modes and compute a final predictor based on a weighted average of each prediction as determined using the respective MIP mode of the two MIP modes. The weights may be applied to each prediction. The weights may be determined based on the cost corresponding to the MIP mode used to determine the prediction. The encoder and/or the decoder may use more than two MIP modes in the template-based MIP mode derivation fusion.

The encoder and/or the decoder may select a plurality of MIP modes (e.g., n MIP modes), from the plurality of MIP modes, that result in n smallest prediction errors/costs for the left template 1806 and/or the top template 1808 (e.g., template-based MIP mode derivation fusion). The encoder and/or the decoder may use the n MIP modes (e.g., with the n smallest prediction errors/costs). The encoder and/or the decoder may predict the current block 1802 using each of the n MIP modes and compute a final predictor based on a weighted average of respective predictions determined using the respective MIP modes. The weights may be applied to each prediction. The weights may be determined based on the cost corresponding to the MIP mode used to determine the prediction.

The template block 1804 may not be of the same dimensions as the current block 1802. The template block 1804 may be offset to the left of the current block 1802 by L1 and/or above the current block 1802 by L2 (e.g., as shown in FIG. 18), while also comprise a right edge that extends to the right edge of the current block 1802 and/or a bottom edge that extends to the bottom edge of the current block 1802.

The plurality of MIP modes, for which the encoder and/or the decoder generate predictions of the left template 1806 and/or the top template 1808 from the reference samples (e.g., the left reference samples refL and/or the top reference samples refT), may comprise only MIP modes that are included in one or more MPM lists constructed for intra prediction of the current block 1802. The one or more MPM lists may be adaptively generated for the current block 1802, for example, based on the availability and/or the indices of intra prediction modes of the top and the left neighboring blocks of the current block 1802 and/or other sources (e.g., an indicator/index of a DIMD intra prediction mode). The one or more MPM lists may be constructed in accordance with VVC, ECM, or any other video coding standard or algorithm. The plurality of MIP modes for which the encoder and/or the decoder may generate predictions of the left template 1806 and/or the top template 1808 from the reference samples (e.g., the left reference samples refL and/or the top reference samples refT) may comprise each weight matrix (or a subset of the weight matrices) of the MIP modes in one or more of sets S0, S1, and S2. The plurality of MIP modes may comprise a transpose of each weight matrix of the MIP modes in the one or more of the sets S0, S1, and S2. The one or more of sets S0, S1, and S2 may be determined based on the size of template block 1804.

Figure 19:
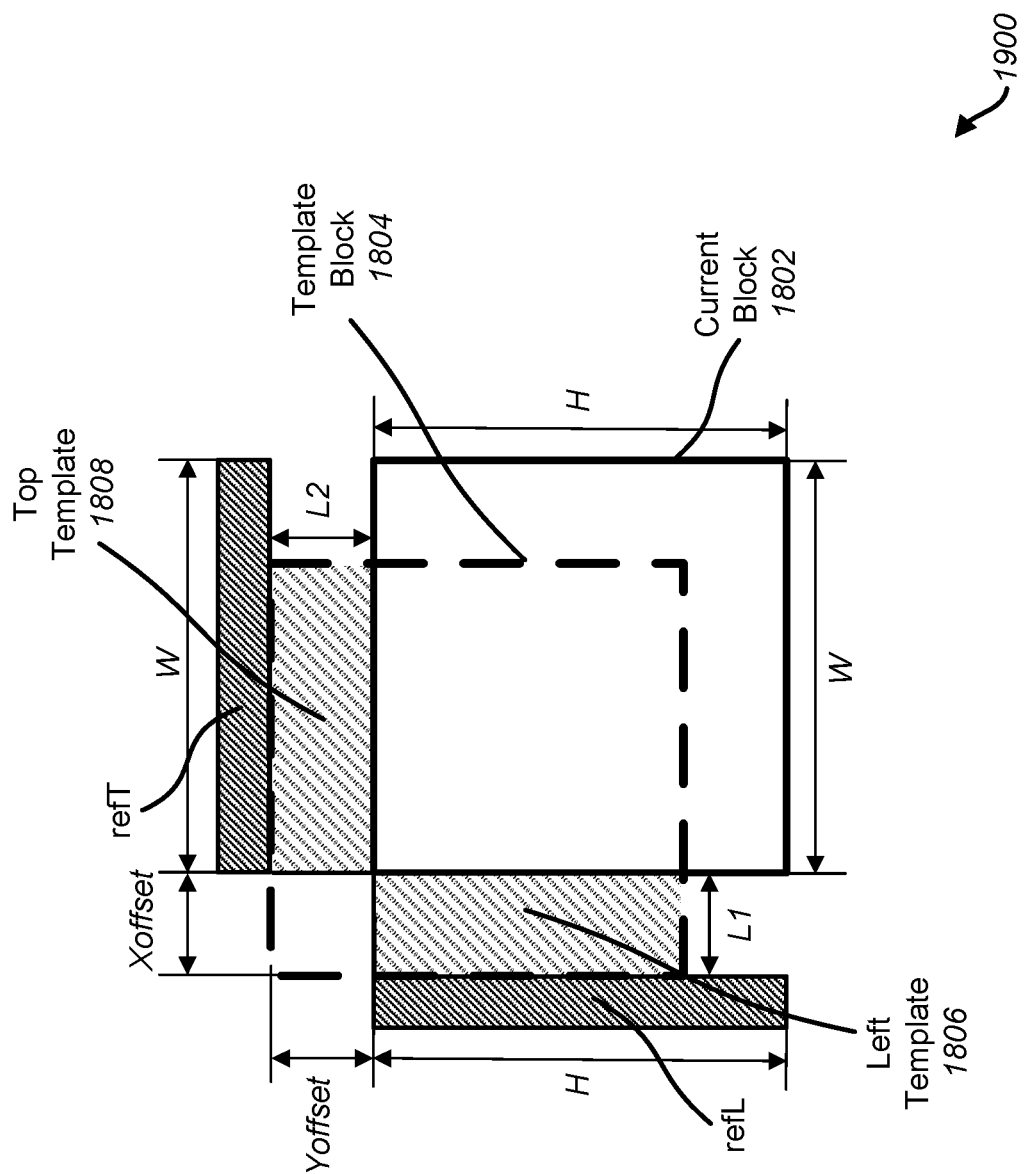
FIG. 19 shows an example of a template-based MIP mode derivation.

FIG. 19 shows an example of a template-based MIP mode derivation. An encoder (e.g., the encoder 200 as shown in FIG. 2) and/or a decoder (e.g., the decoder 300 as shown in FIG. 3) may implement a template-based MIP mode derivation 1900. The template-based MIP mode derivation 1900 may be performed in the same manner as the template-based MIP mode derivation 1800 (e.g., as shown in FIG. 18) except that reference samples (e.g., left reference samples refL and/or top reference samples refT) may be different.

The left reference samples refL may comprise samples, from a column of samples, to the left of the left template 1806. The left reference samples refL may start at a vertical location that is offset relative to a vertical location of the top left most sample of the top template 1808 (or, alternatively, that is offset relative to a vertical location of the top left most sample of the template block 1804). The offset (e.g., L2, as shown in FIG. 19) of the start of the left reference samples refL, relative to the vertical location of the top left most sample of the top template 1808 (or alternatively relative to the vertical location of the top left most sample of the template block 1804), may be Yoffset (e.g., Yoffset>0). The left reference samples refL may span from Yoffset to a combination of Yoffset and H (e.g., Yoffset+H) in the vertical direction relative to the vertical location of the top left most sample of the top template 1808 (or alternatively relative to the vertical location of the top left most sample of the template block 1804). Left reference samples (e.g., that are offset as shown in FIG. 19) may result in a more accurate MIP mode derivation (e.g., an MIP mode that provides a better prediction of the current block 1802) at the encoder and/or the decoder. The offset may result in the left reference samples refL in FIG. 19 being aligned with the current block 1802, enabling the spatial correlation of the (offset) left reference samples refL, with the current block 1802, to improve the accuracy of the MIP mode derivation.

The top reference samples refT may comprise samples, from a row of samples, above the top template 1808. The top reference samples refT may start at a horizontal location that is offset relative to a horizontal location of the top left most sample of the left template 1806 (or, alternatively, that is offset relative to a horizontal location of the top left most sample of the template block 1804). The offset (e.g., L1, as shown in FIG. 19) of the start of the top reference samples refT, relative to the horizontal location of the top left most sample of the left template 1806 (or alternatively relative to the horizontal location of the top left most sample of the template block 1804), may be Xoffset (e.g., Xoffset>0). The top reference samples refT may span from Xoffset to a combination of Xoffset and W (e.g., Xoffset+W) in the horizontal direction relative to the horizontal location of the top left most sample of the left template 1806 (or alternatively relative to the horizontal location of the top left most sample of the template block 1804). Top reference samples (e.g., that are offset as shown in FIG. 19) may result in a more accurate MIP mode derivation (e.g., an MIP mode that provides a better prediction of the current block 1802) at the encoder and/or the decoder. The offset may result in the top reference samples refT in FIG. 19 being aligned with the current block 1802, enabling the spatial correlation of the (offset) top reference samples refT, with the current block 1802, to improve the accuracy of the MIP mode derivation.

One, or both, of the left reference samples refL and the top reference samples refT may be determined differently than as shown in FIG. 18. The left reference samples refL may be determined as described with respect to FIG. 19 (e.g., Yoffset>0) and the top reference samples refT may be determined as described with respect to FIG. 18 (e.g., Xoffset=0). The left reference samples refL may be determined as described with respect to FIG. 18 (e.g., Yoffset=0) and the top reference samples refT may be determined as described with respect to FIG. 19 (e.g., Xoffset>0).

One of the left template 1806 and the top template 1808 may not be available (e.g., for CBs at/near a left or a top boundary of a picture or CTU). Techniques described with respect to FIGS. 20A, 21A, and/or 22A, as described herein, may be used for a CB for which the top template 1808 is not available. Techniques described with respect to FIGS. 20B, 21B, and/or 22B, as described herein, may be used for a CB for which the left template 1806 is not available.

Reference samples used for predicting a top template may be the same as the reference samples used for predicting a left template (e.g., as described with respect to FIGS. 18 and 19). Reference samples used for predicting a top template may be different from the reference samples used for predicting a left template. FIGS. 20A, 20B, 21A, 21B, 22A, and 22B describe the use of different reference samples for predicting a top template and for predicting a left template.

Figure 20B:
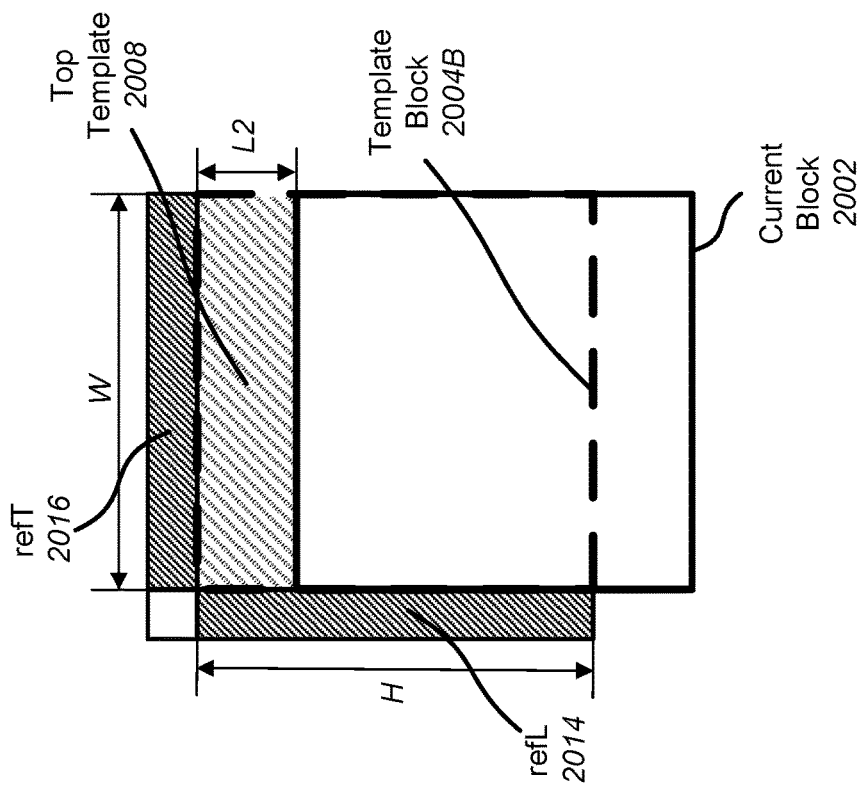
FIG. 20A and FIG. 20B show an example of a template-based MIP mode derivation.
Figure 20A:
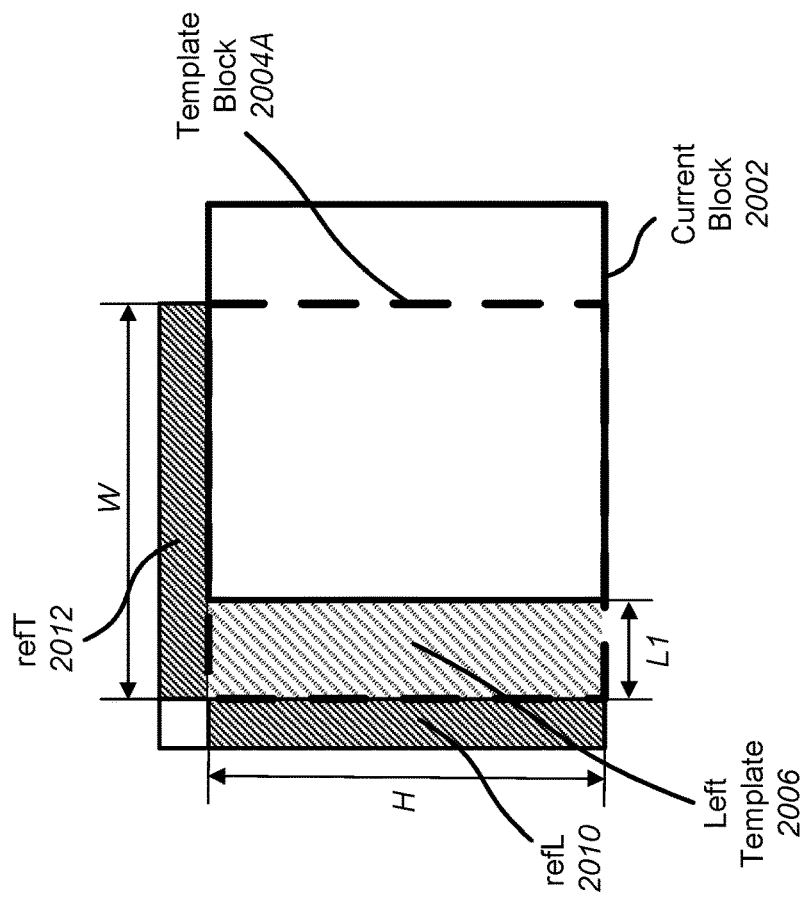

FIGS. 20A and 20B show an example template-based MIP mode derivation. An encoder (e.g., the encoder 200 as shown in FIG. 2) and/or a decoder (e.g., the decoder 300 as shown in FIG. 3) may implement a template-based MIP mode derivation as described with respect to FIG. 20A and/or FIG. 20B. FIG. 20A shows reference samples for determining/generating prediction samples of a left template 2006 for a current block 2002. FIG. 20B shows reference samples for determining/generating prediction samples of a top template 2008 for the current block 2002.

The encoder and/or the decoder may derive an MIP mode (e.g., using template-based MIP mode derivation of FIGS. 20A and 20B) for predicting a current block 2002. The template-based MIP mode derivation may use reconstructed neighboring samples of a current block 2002 that are available at both the encoder and the decoder to derive the MIP mode for predicting the current block 2002. The current block 2002 may be a block within a picture or a frame. The current block 2002 may be a CB within a CTU of a picture or a frame.

The encoder and/or the decoder may perform MIP (e.g., the MIP 1700 as shown in FIG. 17) for a template block 2004A (e.g., shown by dashed lines in FIG. 20A) to derive the MIP mode for the current block 2002. The template block 2004A may have the same dimensions as the current block 2002 The template block 2004A may be offset by a length of L1 samples (e.g., L1>0) to the left of the current block 2002. The encoder and/or the decoder may perform MIP (e.g., the MIP 1700 as described with respect to FIG. 17) to determine a prediction of a portion of the template block 2004A (e.g., a left template 2006). The left template 2006 may comprise reconstructed neighboring samples of the current block 2002. The left template 2006 may be located to the left of the current block 2002. The left template 2006 may or may not comprise samples above the current block 2002 (e.g., above the top left most sample of the current block 2002).

The encoder and/or the decoder may predict samples of the left template 2006. The encoder and/or the decoder may predict samples of the left template 2006, for example, based on one or more reference samples of a column to the left of the template block 2004A (e.g., the column immediately adjacent to the left-most column of the template block 2004A) and reference samples taken from a row above template block 2004A (e.g., the row immediately adjacent to the top-most row of template block 2004A). The samples from the column to the left of the template block 2004A may be left reference samples (e.g., refL 2010). The samples from the row above the template block 2004A may be top reference samples (e.g., refT 2012). The refT 2012 may extend over W samples of the row above the template block 2004A and/or the refL 2010 may extend over H samples of the column to the left of the template block 2004A, for example, if the template block 2004A is of W×H samples in size. The refT 2012 may extend over more or less samples of the row above the template block 2004A and/or the refL 2010 may extend over more or less samples of the column to the left of the template block 2004A. The dimensions W and/or H may be integer powers of two or any other size. W and/or H may be integer powers of two (e.g., between 4 and 64), or may be any other values.

The encoder and/or the decoder may perform one or more steps of an MIP (e.g., the MIP 1700 as described with respect to FIG. 17, one or more of downsampling, matrix-vector multiplication, and/or upsampling). The encoder and/or the decoder may perform one or more steps of an MIP, for example, after the refL 2010 and the refT 2012 are constructed or determined. One or more of the steps of downsampling and/or upsampling may or may not be performed. The MIP may determine or generate prediction samples only for the left template 2006 (e.g., as opposed to prediction samples for the entire area of the template block 2004A). Each of the prediction samples may be determined or generated based on a linear combination of the reference samples (e.g., the refL 2010 and/or the refT 2012) weighted by a respective set of weights (or row of weights) in an MIP weight matrix of an MIP mode. One or more of the sets of weights in an MIP weight matrix of an MIP mode may be eliminated (e.g., not used), for example, based on the one or more sets of weights being used to determine or generate a prediction of a sample that is outside of the left template 2006. One or more of the sets of weights in an MIP weight matrix of an MIP mode may be eliminated (e.g., not used), for example, based on the one or more sets of weights being used to determine or generate a prediction of a sample that is not used during the upsampling step of the MIP to determine a sample that is inside the left template 2006.

The encoder and/or the decoder may perform MIP (e.g., the MIP 1700 as described with respect to FIG. 17) for a template block 2004B (shown by dashed lines) to derive the MIP mode for current block 2002. The template block 2004B may have the same dimensions as the current block 2002 The template block 2004B may be offset by a length of L2 samples (e.g., L2>0) above the current block 2002. The encoder and/or the decoder may perform MIP (e.g., the MIP 1700 as described with respect to FIG. 17) to determine a prediction of a portion of the template block 2004B (e.g., a top template 2008). The top template 2008 may comprise reconstructed neighboring samples of the current block 2002. The top template 2008 may be located above the current block 2002, The top template 2008 may or may not comprise samples to the left of the current block 2002 (e.g., to the left of the top left most sample of the current block 2002).

The encoder and/or the decoder may predict samples of the top template 2008 based on one or more reference samples of a column to the left of the template block 2004B (e.g., the column immediately adjacent to the left-most column of the template block 2004B). The encoder and/or the decoder may predict samples of the top template 2008 based on one or more reference samples of a row above the template block 2004B (e.g., the row immediately adjacent to the top-most row of the template block 2004B). The samples from the column to the left of the template block 2004B may be left reference samples (e.g., refL 2014). The samples from the row above the template block 2004B may be top reference samples (e.g., refT 2016). The refT 2016 may extend over W samples of the row above the template block 2004B and/or the refL 2014 may extend over H samples of the column to the left of the template block 2004B, for example, if the template block 2004B is of W×H samples in size. The refT 2016 may extend over more or less samples of the row above the template block 2004B and/or the refL 2014 may extend over more or less samples of the column to the left of the template block 2004A. The dimensions W and/or H may be integer powers of two or any other size. W and/or H may be integer powers of two (e.g., between 4 and 64) or have any other values.

The encoder and/or the decoder may determine a cost/prediction error of using a respective MIP mode, among a plurality of MIP modes, to determine/generate a prediction of the left template 2006 based on the reference samples (e.g., refL 2010 and/or the refT 2012) and/or a prediction of the top template 2008 based on the reference samples (e.g., the refL 2014 and/or the refT 2016). The encoder and/or the decoder may determine/generate, for each of the plurality of MIP modes, a prediction of the left template 2006 from reference samples refL 2010 and refT 2012 and/or a prediction of top template 2008 from reference samples refL 2014 and refT 2016. The encoder and/or the decoder may determine, for each MIP mode, a cost/prediction error based on a difference (e.g., SSD, SAD, SATD, and/or any other difference): between the prediction samples of the left template 2006 determined for the MIP mode and the reconstructed samples of the left template 2006, and/or between the prediction samples of the top template 2008 determined for the MIP mode and the reconstructed samples of the top template 2008. The respective differences may be combined (e.g., by adding or summing) to produce a cost/prediction error. The encoder and/or the decoder may determine/select an MIP mode, from the plurality MIP modes, based on the determined costs/prediction errors for the plurality of MIP modes. The encoder and/or the decoder may determine/select an MIP mode, from the plurality of MIP modes, that results in a smallest combined cost/prediction error for the left template 2006 and/or the top template 2008. The determined/selected MIP mode may be a template-based MIP mode.

The encoder may determine one or more RD costs of encoding the current block 2002. The encoder may compare an RD cost of encoding the current block 2002 using the template-based MIP mode with RD costs of encoding the current block 1802 using other prediction modes (e.g., other intra and inter prediction modes). The encoder may select/determine an appropriate prediction mode (e.g., among the template-based MIP mode and other prediction modes) to encode the current block 2002 based on the RD costs. The encoder may select/determine the prediction mode with a lowest RD cost.

The encoder may signal/transmit a template-based MIP mode derivation flag (e.g., a one-bit flag) indicating the template-based MIP mode as the prediction mode used to encode the current block 2002, for example, based on the encoder selecting/determining the template-based MIP mode to encode the current block 2002. The encoder may not signal/transmit other syntax elements used to encode the intra prediction of the current block 2002 (e.g., an MPM flag, an MPM index, a binary code for a non-MPM intra prediction mode, and/or any other syntax element), for example, if the template-based MIP mode derivation flag is signaled/transmitted. The decoder may parse the template-based MIP mode derivation flag in a bitstream received from the encoder. The decoder may perform the template-based MIP mode derivation, for example, if the template-based MIP mode derivation flag indicates the template-based MIP mode as the selected intra prediction mode used to encode the current block 2002. The decoder may independently determine/derive the template-based MIP mode and predict the current block 2002, for example, if the template-based MIP mode derivation flag indicates the template-based MIP mode as the selected intra prediction mode. Prediction errors, as determined for the current block 1802 based on the determined template-based MIP mode, may be determined/signaled by an encoder and used at a decoder for encoding/decoding the current block 1802 (e.g., in a manner as described with respect to FIG. 17).

The encoder and/or the decoder may use other selection criteria or cost criteria to select/determine an MIP mode from the plurality of MIP modes. The encoder and/or the decoder may select two MIP modes, from the plurality of MIP modes, that result in the first and the second smallest prediction errors/costs for the left template 2006 and/or the top template 2008 (e.g., template-based MIP mode derivation fusion). The encoder and/or the decoder may use the two MIP modes (e.g., with the first and the second smallest prediction errors or costs). The encoder and/or the decoder may predict the current block 2002 using each of the two MIP modes and compute a final predictor based on an average or weighted average of each prediction as determined using the respective MIP mode of the two MIP modes. The weights may be applied to each prediction. The weights may be determined based on the cost corresponding to the MIP mode used to determine the prediction. The encoder and/or the decoder may use more than two MIP modes in the template-based MIP mode derivation fusion.

The encoder and/or the decoder may select a plurality of MIP modes (e.g., n MIP modes), from the plurality of MIP modes, that result in n smallest prediction errors/costs for the left template 1806 and/or the top template 1808 (e.g., template-based MIP mode derivation fusion). The encoder and/or the decoder may use the n MIP modes (e.g., with the n smallest prediction errors/costs). The encoder and/or the decoder may predict the current block 1802 using each of the n MIP modes and compute a final predictor based on a weighted average of respective predictions determined using the respective MIP modes. The weights may be applied to each prediction. The weights may be determined based on the cost corresponding to the MIP mode used to determine the prediction.

The plurality of MIP modes for which the encoder and/or the decoder generate a prediction of the left template 2006 and/or the top template 2008 from reference samples (e.g., the refL 2010, 2014 and/or the refT 2016, 2012) may comprise only MIP modes that are included in one or more MPM lists constructed for intra prediction of the current block 2002. The one or more MPM lists may be adaptively generated for the current block 2002, for example, based on availability and/or indices of intra prediction modes of the top and the left neighboring blocks of the current block 2002 and/or other sources (e.g., an index of a DIMD intra prediction mode). The one or more MPM lists may be constructed in accordance with VVC, ECM, or any other video coding standard or algorithm. The plurality of MIP modes for which the encoder and/or the decoder may generate a prediction of the left template 2006 and/or the top template 2008 from reference samples (e.g., the refL 2010, 2014 and/or the refT 2016, 2012) may comprise each weight matrix (or a subset of weight matrices) of the MIP modes in one or more of sets S0, S1, and S2. The plurality of MIP modes may a transpose of each weight matrix of the MIP modes in the one of the sets S0, S1, and S2. The one of sets S0, S1, and S2 may be determined based on the size of template block 2004A and/or 2004B.

The template block 2004A may not be of the same dimensions as the current block 2002. The template block 2004A may be offset to the left of the current block 2002 by L1 (e.g., as shown in FIG. 20A) and may comprise a right edge that extends to the right edge of the current block 2002. The template block 2004B may not be of the same dimensions as the current block 2002. The template block 2004B may be offset above the current block 2002 by L2 (e.g., as shown in FIG. 20B) and may comprise a bottom edge that extends to the bottom edge of the current block 2002.

FIGS. 21A and 21B shows example of template-based MIP mode derivation. An encoder (e.g., the encoder 200 as shown in FIG. 2) and/or a decoder (e.g., the decoder 300 as shown in FIG. 3) may implement a template-based MIP mode derivation as described with respect to FIG. 21A and/or FIG. 21B. FIG. 21A shows reference samples for determining/generating prediction samples of a left template 2006 for a current block 2002. FIG. 21B shows reference samples for determining/generating prediction samples of a top template 2008 for the current block 2002. The template-based MIP mode derivation of FIGS. 21A and 21B may be performed in the same manner as the template-based MIP mode derivation as described with respect to FIGS. 20A and 20B) except that reference samples (e.g., the refL 2010 and/or the refT 2016) may be different (e.g., may be offset).

The left reference samples (e.g., refL 2010 as shown in FIG. 21A) may comprise samples, from a column of samples to the left of the left template 2006. The refL 2010 may start at a vertical location that is offset relative to a vertical location of the top left most sample of the left template 2006 (or, alternatively, that is offset relative to a vertical location of the top left most sample of the template block 2004A). The offset (e.g., L2) of the start of the refL 2010 relative to the vertical location of the top left most sample of the left template 2006 (or alternatively relative to the vertical location of the top left most sample of the template block 2004A) may be Yoffset (e.g., Yoffset>0). The refL 2010 may span from Yoffset to a combination of Yoffset and H (e.g., Yoffset+H) in the vertical direction relative to the vertical location of the top left most sample of the left template 2006 (or alternatively relative to the vertical location of the top left most sample of the template block 2004A). Left reference samples refL 2010 (e.g., that are offset as shown in FIG. 21A) may result in a more accurate MIP mode determination/derivation (e.g., an MIP mode that provides a better prediction of the current block 2002) at the encoder and/or the decoder. The offset may enable a potentially better spatial correlation of the left reference samples refL 2010, with the current block 2002, to improve the accuracy of the MIP mode derivation. The top reference samples (e.g., refT 2012 as shown in FIG. 21A) may have a horizontal offset of zero, or more, relative to the top left most sample of the left template 2006 (or, alternatively, the top left most sample of the template block 2004A).

The top reference samples (e.g., refT 2016 as shown in FIG. 21B) may comprise samples, from a row of samples above the top template 2008. The refT 2016 may start at a horizontal location that is offset relative to a horizontal location of the top left most sample of the top template 2008 (or, alternatively, that is offset relative to a horizontal location of the top left most sample of the template block 2004B). The offset (e.g., L1) of the start of the refT 2016 relative to the horizontal location of the top left most sample of the top template 2008 (or alternatively relative to the horizontal location of the top left most sample of the template block 2004B) may be Xoffset (e.g., Xoffset>0). The refT 2016 may span from Xoffset to a combination of Xoffset and W (e.g., Xoffset+W) in the horizontal direction relative to the horizontal location of the top left most sample of the top template 2008 (or alternatively relative to the horizontal location of the top left most sample of the template block 2004B). Top reference samples refT 2016 (e.g., that are offset as shown in FIG. 21B) may result in a more accurate MIP mode determination/derivation (e.g., determination of an MIP mode that provides a better prediction of the current block 2002) at the encoder and/or the decoder. The offset may enable a potentially better spatial correlation of the top reference samples refT 2016, with the current block 2002, to improve the accuracy of the MIP mode derivation. The left reference samples (e.g., refL 2014 as shown in FIG. 21B) may have a vertical offset of zero or more relative to the top left most sample of the top template 2008 (or, alternatively, the top left most sample of the template block 2004B.

One, or both, of the refL 2010 and the refT 2016 may be determined differently than the reference samples as shown in FIGS. 20A and 20B. The refL 2010 may be determined as described with respect to FIG. 20A (e.g., Yoffset=0) and the refT 2016 may be determined as described with respect to FIG. 21B (e.g., Xoffset>0). The refL 2010 may be determined as described with respect to FIG. 21A (e.g., Yoffset>0) and the refT 2016 may be determined as described with respect to FIG. 20B (e.g., Xoffset=0).

FIGS. 22A and 22B show examples of template-based MIP mode derivation. An encoder (e.g., the encoder 200 as shown in FIG. 2) and/or a decoder (e.g., the decoder 300 as shown in FIG. 3) may implement a template-based MIP mode derivation as described with respect to FIG. 22A and/or FIG. 22B. FIG. 22A shows reference samples for determining/generating prediction samples of a left template 2006 for a current block 2002. FIG. 22B shows reference samples for determining/generating prediction samples of a top template 2008 for the current block 2002. The template-based MIP mode derivation of FIGS. 22 and/or 22B may performed in the same manner as the template-based MIP mode derivation as described with respect to FIGS. 20A and/or 20B except that the reference samples (e.g., the refT 2012 and/or the refL 2014) may be different (e.g., may be offset).

The top reference samples (e.g., refT 2012, as shown in FIG. 22A) may comprise samples, from a row of samples above the left template 2006. The refT 2012 may start at a horizontal location that is offset relative to a horizontal location of the top left most sample of the left template 2006 (or, alternatively, that is offset relative to a horizontal location of the top left most sample of the template block 2004A). The offset (e.g., L1) of the start of the refT 2012 relative to the horizontal location of the top left most sample of the left template 2006 (or alternatively relative to the horizontal location of the top left most sample of the template block 2004A) may be Xoffset (e.g., Xoffset>0). The refT 2012 may span from Xoffset to a combination of Xoffset and W (e.g., Xoffset+W) in the horizontal direction relative to the horizontal location of the top left most sample of the left template 2006 (or alternatively relative to the horizontal location of the top left most sample of the template block 2004A). Top reference samples refT 2012 (e.g., that are offset as shown in FIG. 22A) may result in a more accurate MIP mode derivation (e.g., an MIP mode that provides a better prediction of the current block 2002) at the encoder and/or the decoder. The offset may enable a potentially better spatial correlation of the top reference samples refT 2012, with the current block 2002, to improve the accuracy of the MIP mode derivation. The better spatial correlation may result from an alignment of the top reference samples refT 2012 with the current block 2002. he left reference samples (e.g., refL 2010, as shown in FIG. 22A) may have a vertical offset of zero or more relative to the top left most sample of the left template 2006 (or, alternatively, the top left most sample of the template block 2004A).

The left reference samples (e.g., refL 2014, as shown in FIG. 22B) may comprise samples, from a column of samples to the left of the top template 2008. The refL 2014 may start at a vertical location that is offset relative to a vertical location of the top left most sample of the top template 2008 (or, alternatively, that is offset relative to a vertical location of the top left most sample of the template block 2004B). The offset (e.g., L2) of the start of the refL 2014 relative to the vertical location of the top left most sample of the top template 2008 (or alternatively relative to the vertical location of the top left most sample of the template block 2004B) may be Yoffset (e.g., Yoffset>0). The refL 2014 may span from Yoffset to a combination of Yoffset and H (e.g., Yoffset+H) in the vertical direction relative to the vertical location of the top left most sample of the top template 2008 (or alternatively relative to the vertical location of the top left most sample of the template block 2004B). Left reference samples refL 2014 (e.g., that are offset as shown in FIG.

22B) may result in a more accurate MIP mode derivation (e.g., an MIP mode that provides a better prediction of the current block 2002) at the encoder and/or the decoder. The offset may enable a potentially better spatial correlation of the left reference samples refT 2014, with the current block 2002, to improve the accuracy of the MIP mode derivation. The better spatial correlation may result from an alignment of the left reference samples refT 2014 with the current block 2002. The top reference samples (e.g., refT 2016, as shown in FIG. 22B) may have a horizontal offset of zero or more relative to the top left most sample of the top template 2008 (or, alternatively, the top left most sample of the template block 2004B).

One or both of the refT 2012 and the refL 2014 may be determined differently than the reference samples as shown in FIGS. 22A and 22B. The refT 2012 may be determined as described with respect to FIG. 20A (e.g., Xoffset=0) and the refL 2014 may be determined as described with respect to FIG. 22B (e.g., Yoffset>0). The refT 2012 may be determined as described with respect to FIG. 22A (e.g., Xoffset>0) and the refL 2014 may be determined as described with respect to FIG. 20B (e.g., Yoffset=0).

One of the left template 2006 and the top template 2008 may not be available (e.g., for current blocks at/near a left or a top boundary of a picture or CTU). In such scenarios, one template block (e.g., either left template block or the top template block, as per availability) may be used for determining costs/prediction errors for each of the plurality of MIP modes. The encoder and/or the decoder may determine a cost/prediction error of using a respective MIP mode, among a plurality of MIP modes, to determine/generate a respective prediction of the left template 2006 based on the reference samples (e.g., refL 2010 and/or the refT 2012), for example, if a top template is not available. The encoder and/or the decoder may determine/generate, for each of the plurality of MIP modes, a prediction of the left template 2006 from reference samples refL 2010 and refT 2012. The encoder and/or the decoder may determine, for each MIP mode, a cost/prediction error based on a difference (e.g., SSD, SAD, SATD, and/or any other difference) between the prediction samples of the left template 2006 determined for the MIP mode and the reconstructed samples of the left template 2006. The encoder and/or the decoder may determine/select an MIP mode, from the plurality MIP modes, based on the determined costs/prediction errors. The encoder and/or the decoder may determine/select an MIP mode, from the plurality of MIP modes, that results in a smallest cost/prediction error for the left template 2006. The determined/selected MIP mode may be the template-based MIP mode.

The encoder and/or the decoder may determine a cost/prediction error of using a respective MIP mode, among a plurality of MIP modes, to determine/generate a respective prediction of the top template 2008 based on the reference samples (e.g., the refL 2014 and/or the refT 2016), for example, if a left template is not available. The encoder and/or the decoder may determine/generate, for each of the plurality of MIP modes, a prediction of top template 2008 from reference samples refL 2014 and refT 2016. The encoder and/or the decoder may determine, for each MIP mode, a cost/prediction error based on a difference (e.g., SSD, SAD, SATD, and/or any other difference) between the prediction samples of the top template 2008 determined for the MIP mode and the reconstructed samples of the top template 2008. The encoder and/or the decoder may determine/select an MIP mode, from the plurality MIP modes, based on the determined costs/prediction errors. The encoder and/or the decoder may determine/select an MIP mode, from the plurality of MIP modes, that results in a smallest cost/prediction error for the top template 2008. The determined/selected MIP mode may be the template-based MIP mode.

Figure 23A:
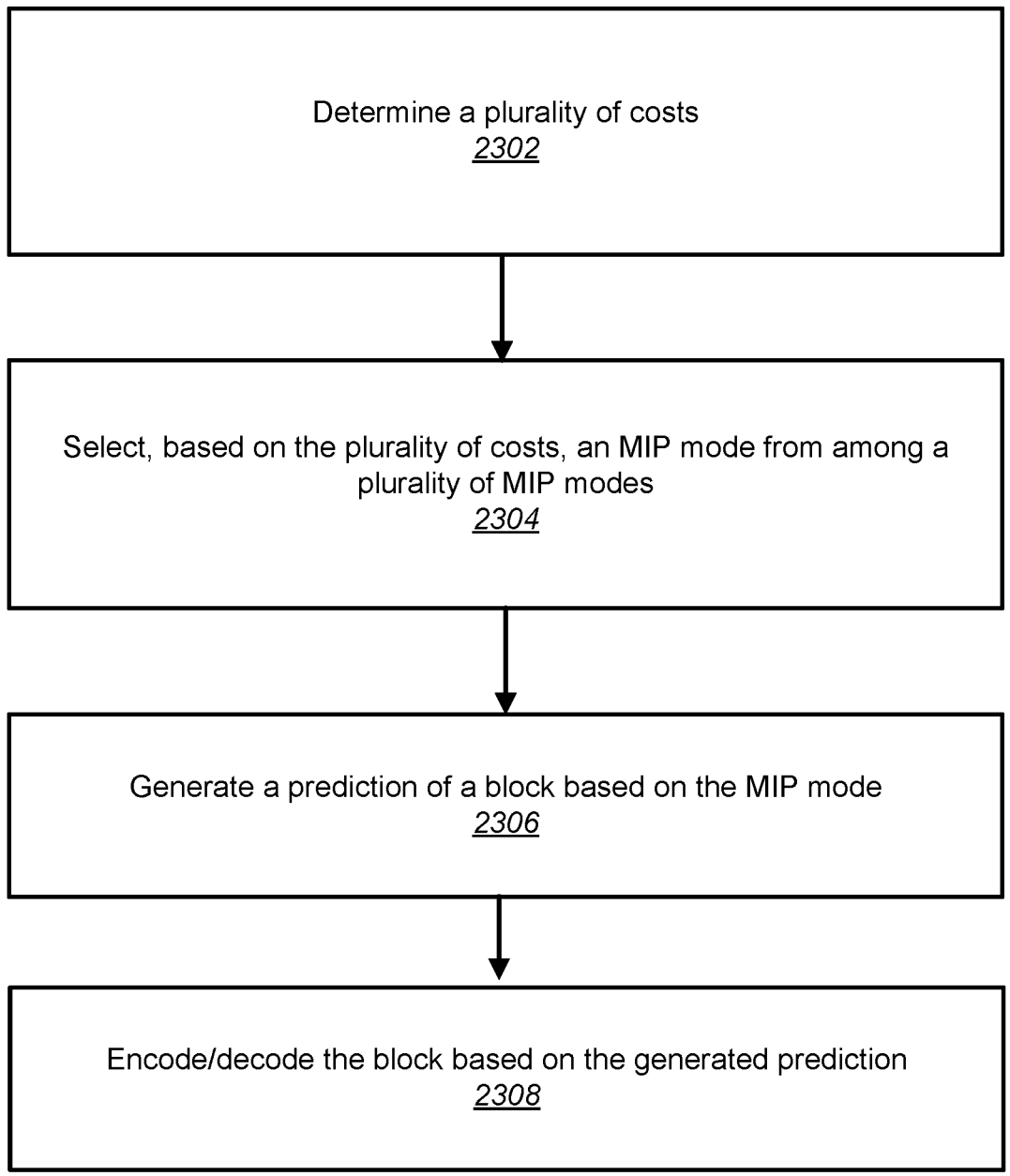
FIG. 23A show an example method of template-based MIP mode derivation.

FIG. 23A shows an example method of template-based MIP mode derivation. An encoder (e.g., the encoder 200 as shown in FIG. 2) and/or a decoder (e.g., the decoder 300 as shown in FIG. 3) may perform the method 2300 for template-based MIP mode derivation.

At step 2302, a plurality of costs/prediction errors may be determined. Each of the plurality costs may be a cost of using a respective MIP mode among a plurality of MIP modes to determine a prediction a first template and/or a second template. The prediction of the first template and/or the second template may be determined based on reference samples (e.g., reference samples to the left and/or above the first template and the second template). For example, the prediction of the first template may be determined based on first reference samples, and the prediction of the second template may be determined based on the second reference samples. The first template may be located above the block and the second template may be located to the left of the block The prediction of the first template (e.g., prediction samples of the first template), for an MIP mode, may be determined/generated based on a plurality of linear combinations of the first reference samples weighted by a weight matrix of the respective MIP mode. Each of the plurality of linear combinations may be weighted by a respective set of weight values (or row of weight values) in the weight matrix of the respective MIP mode and may be used to determine/generate a prediction sample of the prediction of the first template. At least one set of weight values in the weight matrix of the respective MIP mode may not be used (e.g., eliminated) to determine/generate the prediction of the first template based on a prediction sample, associated with the at least one set of weight values, corresponding to a sample located outside of the first template.

The prediction of the second template (e.g., prediction samples of the second template), for an MIP mode, may be determined/generated based on a plurality of linear combinations of the second reference samples weighted by a weight matrix of the MIP mode. Each of the plurality of linear combinations may be weighted by a respective set of weight values (or row of weight values) in the weight matrix of the respective MIP mode and may be used to determine/generate a prediction sample of the prediction of the second template. At least one set of weight values in the weight matrix of the respective MIP mode may not be used (e.g., eliminated) to determine/generate the prediction of the second template based on a prediction sample, associated with the at least one set of weight values, corresponding to a sample located outside of the first template.

The cost/prediction error, for a respective MIP mode among the plurality of MIP modes, may be determined. The cost/prediction error, for a respective MIP mode among the plurality of MIP modes, may be determined, for example, based on a first difference associated with the respective MIP mode and a second difference associated with the respective MIP mode. The first difference may be a difference between the first template and the prediction of the first template as determined using the respective MIP mode among the plurality of MIP modes. The second difference may be a difference between the second template and the prediction of the second template determined using the respective MIP mode among the plurality of MIP modes. The cost, for the respective MIP mode, may be determined based on a combination (e.g., sum or addition) of the first difference associated with the respective MIP mode and the second difference associated with the respective MIP mode.

The first template may be located above the block and may not comprise samples to the left of the block. The second template may be located to the left of the block and may not comprise samples above the block. The first reference samples may be different from the second reference samples. The first reference samples may comprise: left reference samples, from a column of samples to the left of the first template, that start at a vertical location of Yoffset relative to a vertical location of the top left most sample of the first template (e.g., Yoffset≥0); and top reference samples, from a row of samples above the first template, that start at a horizontal location of Xoffset relative to a horizontal location of the top left most sample of the first template (e.g., Xoffset>0). Vertical locations of the left reference samples may span from Yoffset to a combination of Yoffset and H (e.g., Yoffset+H), where H may be equal to a height of the block, and horizontal locations of the top reference samples may span from Xoffset to a combination of Xoffset and W (e.g., Xoffset+W), where W may be equal to a width of the block.

The first template may be located above the block and may not comprise samples to the left of the block. The second template may be located to the left of the block and may not comprise samples above the block. The first reference samples may be different from the second reference samples. The second reference samples may comprise: left reference samples, from a column of samples to the left of the second template, that start at a vertical location of Yoffset relative to a vertical location of the top left most sample of the second template (e.g., Yoffset>0); and top reference samples, from a row of samples above the second template, that start at a horizontal location of Xoffset relative to a horizontal location of the top left most sample of the second template (e.g., Xoffset≥0). Vertical locations of the left reference samples may span from Yoffset to a combination of Yoffset and H (e.g., Yoffset+H), where H may be equal to a height of the block; and horizontal locations of the top reference samples may span from Xoffset to a combination of Xoffset and W (e.g., Xoffset+W), where W may be equal to a width of the block.

The first template may be located above the block and may not comprise samples to the left of the block. The second template may be located to the left of the block and may not comprise samples above the block. The first reference samples may be different from the second reference samples. The first reference samples may comprise: left reference samples, from a column of samples to the left of the first template, that start at a vertical location of Yoffset relative to a vertical location of the top left most sample of the first template (e.g., Yoffset>0); and top reference samples, from a row of samples above the first template, that start at a horizontal location of Xoffset relative to a horizontal location of the top left most sample of the first template (e.g., Xoffset≥0). Vertical locations of the left reference samples may span from Yoffset to a combination of Yoffset and H (e.g., Yoffset+H), where H may be equal to a height of the block, and horizontal locations of the top reference samples may span from Xoffset to a combination of Xoffset and W (e.g., Xoffset+W), where W may be equal to a width of the block.

The first template may be located above the block and may not comprise samples to the left of the block. The second template may be located to the left of the block and may not comprise samples above the block. The first reference samples may be the same as the second reference samples. The first reference samples and the second reference samples may comprise: left reference samples, from a column of samples to the left of the second template, that start at a vertical location of Yoffset relative to a vertical location of the top left most sample of the first template, (e.g., Yoffset>0); and top reference samples, from a row of samples above the first template, that start at a horizontal location of Xoffset relative to a horizontal location of the top left most sample of the second template (e.g., Xoffset>0).

At step 2304, an MIP mode from among the plurality of MIP modes may be selected/determined. MIP mode from among the plurality of MIP modes may be selected/determined, for example, based on the plurality of costs. The MIP mode may be selected/determined based on the cost of using the MIP mode being the smallest/lowest among costs of using the plurality of MIP modes. At step 2306, a prediction of a block may be determined/generated based on the MIP mode. For example, the prediction of the block may be generated based on the MIP mode and reference samples associated with the block (e.g., as described with respect to FIG. 17). At step 2308, an encoder and/or a decoder may use the generated prediction to encode and/or decode the block (e.g., as described with respect to FIG. 17). For example, an encoder may determine a prediction error based on the block (e.g., original block) and the prediction of the block. The encoder may send/signal the prediction error for storage and/or transmission. The decoder may use the prediction and the prediction error to decode the block.

Figure 23B:
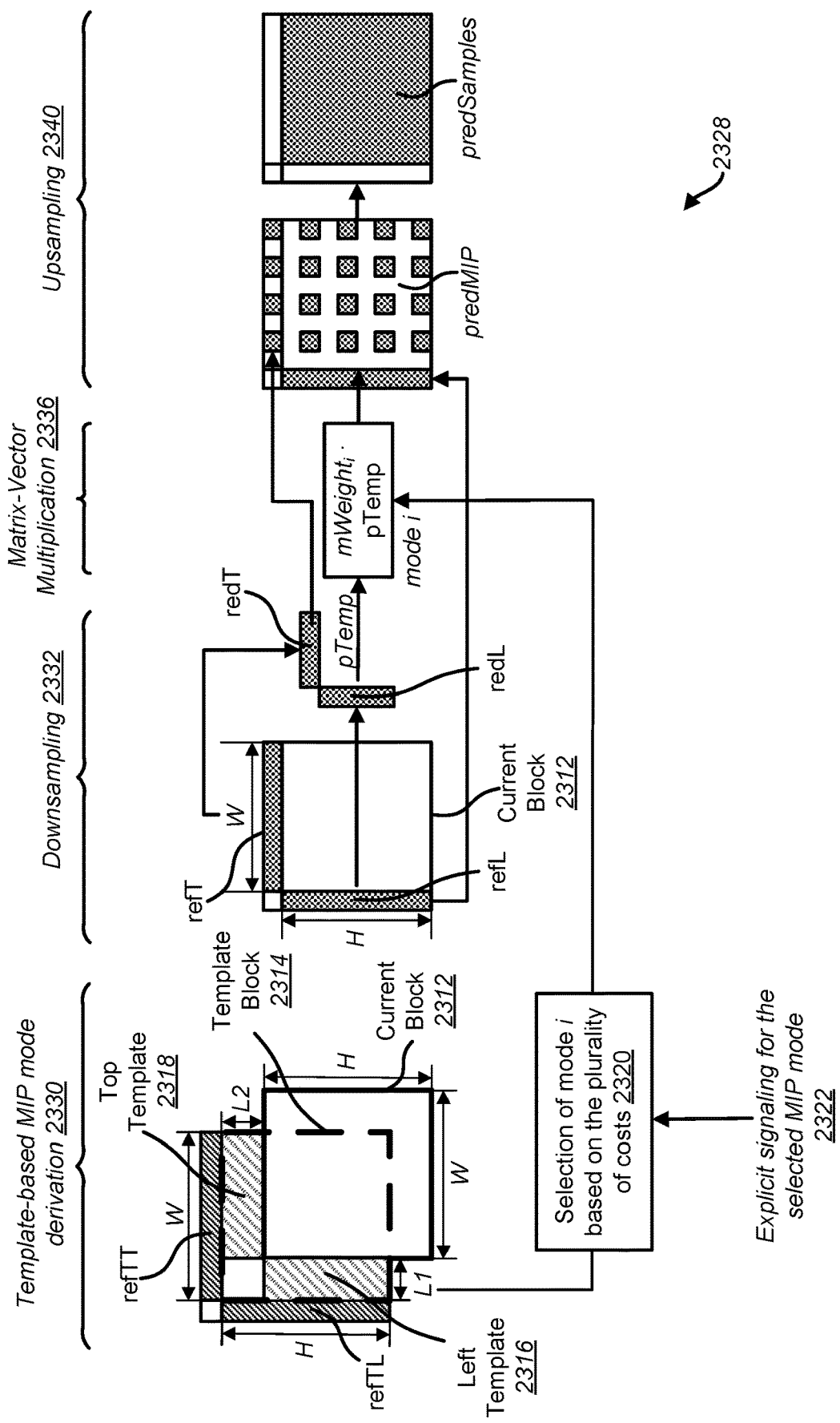
FIG. 23B shows an example of encoding and/or decoding a block based on template-based MIP mode derivation.

FIG. 23B shows an example of encoding and/or decoding a block based on template-based MIP mode derivation. The encoding and/or decoding 2328 of the block (e.g., current block 2312), as described with respect to FIG. 23B, may be in in accordance with the method 2300 of FIG. 23A. The encoding and/or decoding 2328 may comprise one or more of template-based MIP mode derivation 2330, downsampling 2332, matrix-vector multiplication 2336, upsampling 2340, and/or any other additional steps/processes.

The template-based MIP mode derivation may comprise steps 2302 and 2304 as described with respect to FIG. 23A. The first template may be left template 2316 and the second template may be the top template 2318. At step 2320, an MIP mode i may be selected/determine based on a determined plurality of costs. The plurality of costs may comprise costs of using a respective MIP mode, among a plurality of MIP modes, to determine a prediction (e.g., based on the left reference samples refTL and the top reference samples refTT) of the left template 2316 and/or the top template 2318. The MIP mode may be selected/determined based on the cost of using the MIP mode i being the smallest/lowest among costs of using the plurality of MIP modes. Additional signaling 2322 may be indicated (e.g., by an encoder via a bitstream comprising encoded information) to enable a decoder to determine the MIP mode i based on the template-based MIP mode derivation. The signaling 2322 may comprise an indication that the decoder is to perform the template-based MIP mode derivation to determine the MIP mode i. Downsampling 2332, matrix-vector multiplication 2336, upsampling 2340 may be similar or substantially similar to downsampling 1705, matrix-vector multiplication 1710, upsampling 1715 as described with respect to FIG. 17.

Various examples herein may be implemented in hardware (e.g., using analog and/or digital circuits), in software (e.g., through execution of stored/received instructions by one or more general purpose or special-purpose processors), and/or as a combination of hardware and software. Various examples herein may be implemented in an environment comprising a computer system or other processing system.

Figure 24:
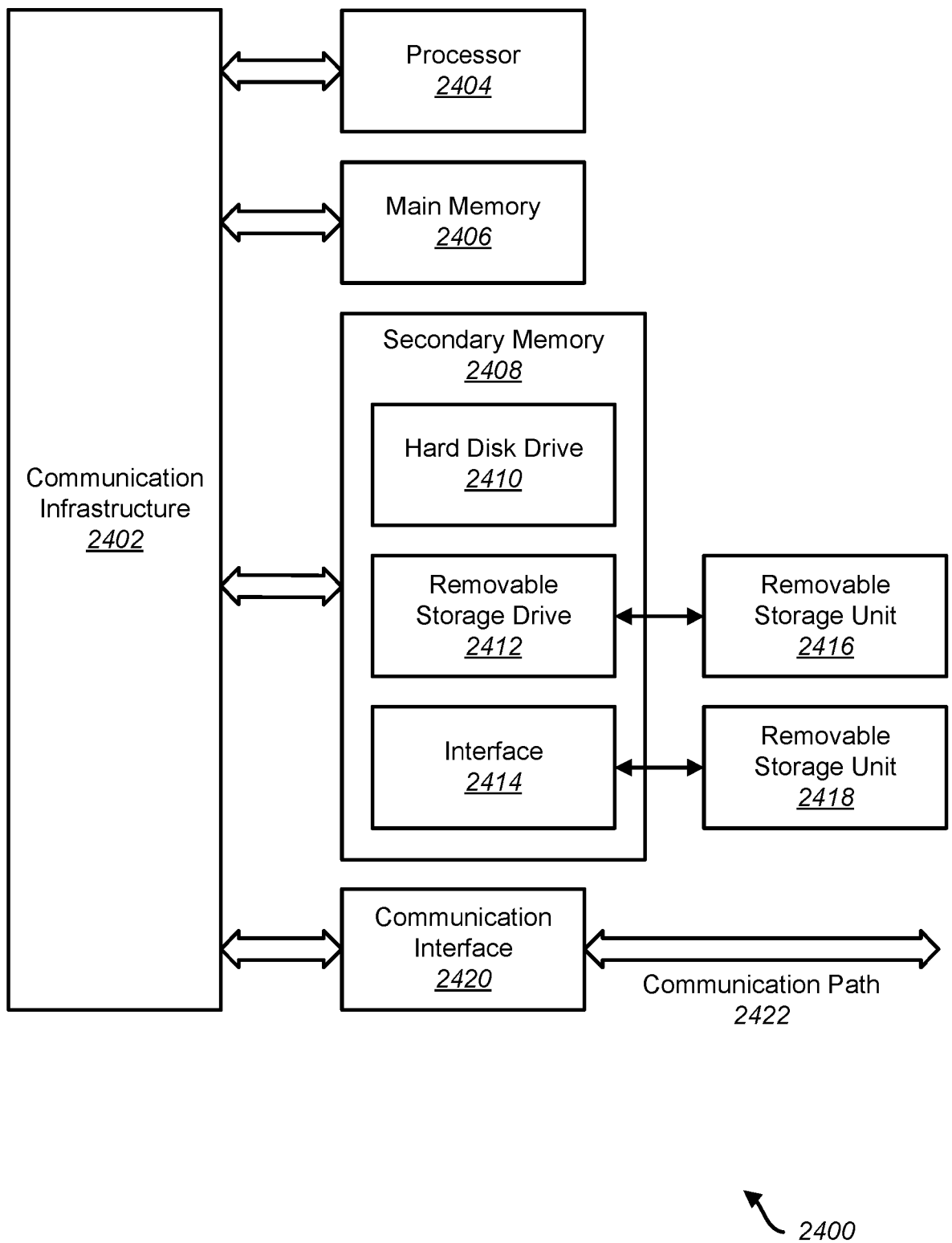
FIG. 24 shows an example computer system that may be used any of the examples described herein.

FIG. 24 shows an example computer system that may be used any of the examples described herein. For example, the example computer system 2400 shown in FIG. 24 may implement one or more of the methods described herein. For example, various devices and/or systems described herein (e.g., in FIGS. 1, 2, and 3) may be implemented in the form of one or more computer systems 2400. Furthermore, each of the steps of the flowcharts depicted in this disclosure may be implemented on one or more computer systems 2400.

The computer system 2400 may comprise one or more processors, such as a processor 2404. The processor 2404 may be a special purpose processor, a general purpose processor, a microprocessor, and/or a digital signal processor. The processor 2404 may be connected to a communication infrastructure 2402 (for example, a bus or network). The computer system 2400 may also comprise a main memory 2406 (e.g., a random access memory (RAM)), and/or a secondary memory 2408.

The secondary memory 2408 may comprise a hard disk drive 2410 and/or a removable storage drive 2412 (e.g., a magnetic tape drive, an optical disk drive, and/or the like). The removable storage drive 2412 may read from and/or write to a removable storage unit 2416. The removable storage unit 2416 may comprise a magnetic tape, optical disk, and/or the like. The removable storage unit 2416 may be read by and/or may be written to the removable storage drive 2412. The removable storage unit 2416 may comprise a computer usable storage medium having stored therein computer software and/or data.

The secondary memory 2408 may comprise other similar means for allowing computer programs or other instructions to be loaded into the computer system 2400. Such means may include a removable storage unit 2418 and/or an interface 2414. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2418 and interfaces 2414 which may allow software and/or data to be transferred from the removable storage unit 2418 to the computer system 2400.

The computer system 2400 may also comprise a communications interface 2420. The communications interface 2420 may allow software and data to be transferred between the computer system 2400 and external devices. Examples of the communications interface 2420 may include a modem, a network interface (e.g., an Ethernet card), a communications port, etc. Software and/or data transferred via the communications interface 2420 may be in the form of signals which may be electronic, electromagnetic, optical, and/or other signals capable of being received by the communications interface 2420. The signals may be provided to the communications interface 2420 via a communications path 2422. The communications path 2422 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2416 and 2418 or a hard disk installed in the hard disk drive 2410. The computer program products may be means for providing software to the computer system 2400. The computer programs (which may also be called computer control logic) may be stored in the main memory 2406 and/or the secondary memory 2408. The computer programs may be received via the communications interface 2420. Such computer programs, when executed, may enable the computer system 2400 to implement the present disclosure as discussed herein. In particular, the computer programs, when executed, may enable the processor 2404 to implement the processes of the present disclosure, such as any of the methods described herein. Accordingly, such computer programs may represent controllers of the computer system 2400.

Figure 25:
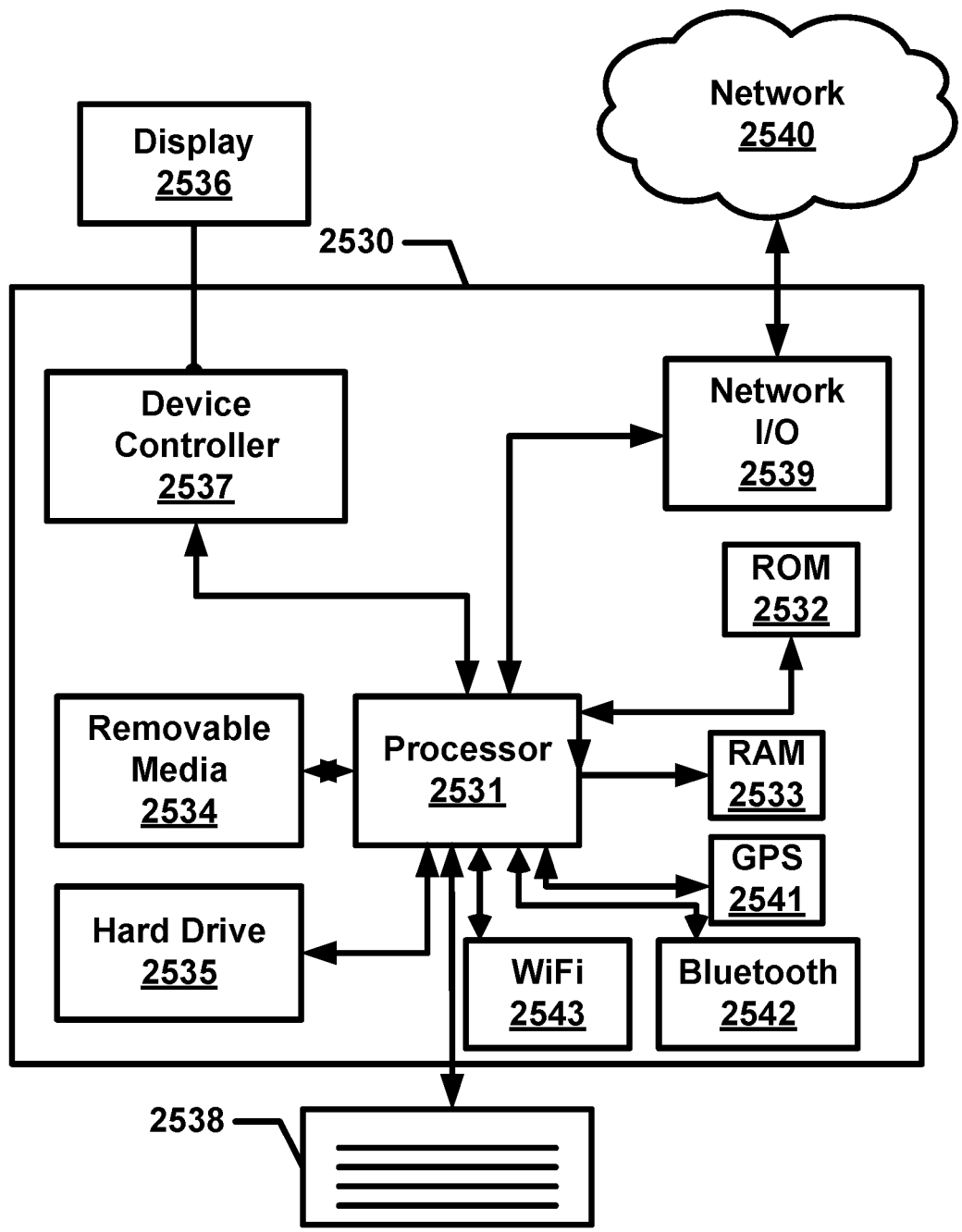
FIG. 25 shows example elements of a computing device that may be used to implement any of the various devices described herein.

FIG. 25 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2530 may include one or more processors 2531, which may execute instructions stored in the random-access memory (RAM) 2533, the removable media 2534 (such as a Universal Serial Bus (USB) drive, compact disk (CD) or digital versatile disk (DVD), or floppy disk drive), or any other desired storage medium. Instructions may also be stored in an attached (or internal) hard drive 2535. The computing device 2530 may also include a security processor (not shown), which may execute instructions of one or more computer programs to monitor the processes executing on the processor 2531 and any process that requests access to any hardware and/or software components of the computing device 2530 (e.g., ROM 2532, RAM 2533, the removable media 2534, the hard drive 2535, the device controller 2537, a network interface 2539, a GPS 2541, a Bluetooth interface 2542, a WiFi interface 2543, etc.). The computing device 2530 may include one or more output devices, such as the display 2536 (e.g., a screen, a display device, a monitor, a television, etc.), and may include one or more output device controllers 2537, such as a video processor. There may also be one or more user input devices 2538, such as a remote control, keyboard, mouse, touch screen, microphone, etc. The computing device 2530 may also include one or more network interfaces, such as a network interface 2539, which may be a wired interface, a wireless interface, or a combination of the two. The network interface 2539 may provide an interface for the computing device 2530 to communicate with a network 2540 (e.g., a RAN, or any other network). The network interface 2539 may include a modem (e.g., a cable modem), and the external network 2540 may include communication links, an external network, an in-home network, a provider's wireless, coaxial, fiber, or hybrid fiber/coaxial distribution system (e.g., a DOCSIS network), or any other desired network. Additionally, the computing device 2530 may include a location-detecting device, such as a global positioning system (GPS) microprocessor 2541, which may be configured to receive and process global positioning signals and determine, with possible assistance from an external server and antenna, a geographic position of the computing device 2530.

The example in FIG. 25 may be a hardware configuration, although the components shown may be implemented as software as well. Modifications may be made to add, remove, combine, divide, etc. components of the computing device 2530 as desired. Additionally, the components may be implemented using basic computing devices and components, and the same components (e.g., processor 2531, ROM storage 2532, display 2536, etc.) may be used to implement any of the other computing devices and components described herein. For example, the various components described herein may be implemented using computing devices having components such as a processor executing computer-executable instructions stored on a computer-readable medium, as shown in FIG. 25. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine a plurality of costs associated with a plurality of matrix-based intra prediction (MIP) modes. Each cost, of the plurality of costs, is based on: a prediction, using each MIP mode, of a first template based on first reference samples; and a prediction, using each MIP mode, of a second template based on second reference samples. The computing device may select, based on the plurality of costs, an MIP mode of the plurality of MIP modes. The computing device may generate, based on the selected MIP mode, a prediction of a block. The computing device may also perform one or more additional operations. The first template may be located above the block and may not comprise any samples located to the left of the block. The second template may be located to the left of the block and may not comprise any samples located above the block. Each cost may be determined based on: a first difference between the prediction of the first template, using each MIP mode, and the first template; and a second difference between the prediction of the second template, using each MIP mode, and the second template. Each cost may be determined based on a sum of the first difference and the second difference. The selecting the MIP mode may comprise selecting the MIP mode based on a cost associated with the MIP mode being lowest among the plurality of costs. The first reference samples may comprise: left reference samples from a column of samples located to the left of the first template; and top reference samples, from a row of samples located above the first template. The left reference samples, of the first reference samples, may start at a vertical location that is offset (e.g., offset≥0, or offset>0) relative to a vertical location of a top-left sample of the first template. The top reference samples, of the first reference samples, may start at a horizontal location that is offset (e.g., offset≥0, or offset>0) relative to a horizontal location of the top-left sample of the first template. Vertical locations of the left reference samples, of the first reference samples, may span from Yoffset to (Yoffset+H), where Yoffset is the offset relative to the vertical location of the top-left sample of the first template and H is equal to a height of the block. Horizontal locations of the top reference samples, of the first reference samples, may span from Xoffset to (Xoffset+W), where Xoffset is the offset relative to the horizontal location of the top-left sample of the first template and W is equal to a width of the block. The second reference samples may comprise: left reference samples from a column of samples located to the left of the second template; and top reference samples, from a row of samples located above the second template. The left reference samples, of the second reference samples, may start at a vertical location that is offset (e.g., offset≥0, or offset>0) relative to a vertical location of a top-left sample of the second template. The top reference samples, of the second reference samples, may start at a horizontal location that is offset (e.g., offset≥0, or offset>0) relative to a horizontal location of the top-left sample of the second template. Vertical locations of the left reference samples, of the second reference samples, may span from Yoffset to (Yoffset+H), where Yoffset is the offset relative to the vertical location of the top-left sample of the second template and H is equal to a height of the block. Horizontal locations of the top reference samples, of the second reference samples, may span from Xoffset to (Xoffset+W), where Xoffset is the offset relative to the horizontal location of the top-left sample of the second template and W is equal to a width of the block. The computing device may, based on a plurality of linear combinations of the first reference samples weighted by a weight matrix of each MIP mode, determine the prediction of the first template. The computing device may, based on a plurality of linear combinations of the second reference samples weighted by a weight matrix of each MIP mode, determine the prediction of the second template. At least one set of weight values in the weight matrix of each MIP mode may not be used to determine the prediction of the first template based on a prediction sample, associated with the one or more weight values, being located outside the first template or the second template. The computing device may send a prediction error for the block, wherein the prediction error for the block is determined based on the block and the prediction of the block. The computing device may receive a prediction error for the block. The computing device may determine, based on the prediction of the block and the prediction error for the block, at least one of luminance sample values or chrominance sample values associated with the block. The selecting, based on the plurality of costs, the MIP mode may comprise selecting the MIP mode based on receiving an MIP mode derivation indication. The first reference samples and the second reference samples may comprise: left reference samples from a column of samples located to the left of the first template; and top reference samples, from a row of samples located above the second template. The first reference samples may be different from the second reference samples. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to receive a prediction error determined based on the prediction of the block. A computer-readable medium may store instructions that, when executed, cause performance of the described method, additional operations and/or include the additional elements.

A computing device may perform a method comprising multiple operations. The computing device may determine a plurality of costs of a plurality of matrix-based intra prediction (MIP) modes. Each cost may be associated with predictions, using each MIP mode, of a first template and a second template based on reference samples. The computing device may select, based on the plurality of costs, an MIP mode of the plurality of MIP modes. The computing device may generate, based on the selected MIP mode, a prediction of a block. The computing device may also perform one or more additional operations. The first template may be located above the block and may not comprise any samples located to the left of the block. The second template may be located to the left of the block and may not comprise any samples located above the block. The computing device may determine each cost of each MIP mode based on: a first difference between a prediction of the first template, using each MIP mode, and the first template; and a second difference between a prediction of the second template, using each MIP mode, and the second template. The reference samples may comprise: left reference samples from a column of samples located to the left of the first template; and top reference samples, from a row of samples located above the second template. A prediction of the first template may be determined based on a plurality of linear combinations of the reference samples weighted by a weight matrix of each MIP mode. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to receive a prediction error determined based on the prediction of the block. A computer-readable medium may store instructions that, when executed, cause performance of the described method, additional operations and/or include the additional elements.

A computing device may perform a method comprising multiple operations. The computing device may, based on receiving a matrix-based intra prediction (MIP) mode derivation indication, select an MIP mode of a plurality of MIP modes. The selecting the MIP mode may be based on a cost, associated with the MIP mode for predicting a first template and a second template, being lowest of costs associated with the plurality of MIP modes. The computing device may, based on the MIP mode, generate a prediction of a block. The computing device may also perform one or more additional operations. Each cost associated with each MIP mode may be determined based on: a prediction, using each MIP mode, of the first template based on first reference samples; and a prediction, using each MIP mode, of the second template based on second reference samples. Each cost associated with each MIP mode may be determined based on predictions, using each MIP mode, of a first template and a second template based on reference samples. The first template may be located above the block and may not comprise any samples located to the left of the block. The second template may be located to the left of the block and may not comprise any samples located above the block. The computing device may receive a prediction error for the block. The computing device may determine, based on the prediction of the block and the prediction error for the block, at least one of luminance sample values or chrominance sample values associated with the block. The predicting the first template and the second template may comprise predicting the first template and the second template based on reference samples. The reference samples may comprise: left reference samples from a column of samples located to the left of the first template; and top reference samples, from a row of samples located above the second template. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to receive a prediction error determined based on the prediction of the block. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:
1. A method comprising:
 determining, by a computing device, a plurality of costs associated with a plurality of matrix-based intra prediction (MIP) modes, wherein each cost, of the plurality of costs, is based on:
  a prediction, using each MIP mode, of a first template based on first reference samples, wherein the first reference samples start at a first location that is aligned with a location of a top-leftmost sample of the first template; and
  a prediction, using each MIP mode, of a second template based on second reference samples, wherein the second reference samples start at a second location that is aligned with a location of a top-leftmost sample of the second template;
 selecting, based on the plurality of costs, an MIP mode of the plurality of MIP modes; and
 generating, based on the selected MIP mode, a prediction of a block.
2. The method of claim 1, wherein:
 the first template is located above the block and does not comprise any samples located to the left of the block; and
 the second template is located to the left of the block and does not comprise any samples located above the block.
3. The method of claim 1, wherein each cost is determined based on:
 a first difference between the prediction of the first template, using each MIP mode, and the first template; and a second difference between the prediction of the second template, using each MIP mode, and the second template.

4. The method of claim 1, wherein the first reference samples comprise:
left reference samples from a column of samples located to the left of the first template; and
top reference samples from a row of samples located above the first template.

5. The method of claim 1, wherein the second reference samples comprise:
left reference samples from a column of samples located to the left of the second template; and
top reference samples from a row of samples located above the second template.

6. The method of claim 1, further comprising:
based on a plurality of linear combinations of the first reference samples weighted by a weight matrix of each MIP mode, determining the prediction of the first template.

7. The method of claim 1, further comprising:
sending a prediction error for the block, wherein the prediction error for the block is determined based on the block and the prediction of the block.

8. The method of claim 1, further comprising:
receiving a prediction error for the block; and
determining, based on the prediction of the block and the prediction error for the block, at least one of luminance sample values or chrominance sample values associated with the block.

9. The method of claim 1, wherein the selecting, based on the plurality of costs, the MIP mode comprises selecting the MIP mode based on receiving an MIP mode derivation indication.

10. A method comprising:
determining, by a computing device, a plurality of costs of a plurality of matrix-based intra prediction (MIP) modes, wherein each cost is associated with predictions, using each MIP mode, of a first template and a second template based on reference samples that start at a location that is aligned with at least one of:
a location of a top-leftmost sample of the first template; or
a location of a top-leftmost sample of the second template;
selecting, based on the plurality of costs, an MIP mode of the plurality of MIP modes; and
generating, based on the selected MIP mode, a prediction of a block.

11. The method of claim 10, wherein:
the first template is located above the block and does not comprise any samples located to the left of the block; and
the second template is located to the left of the block and does not comprise any samples located above the block.

12. The method of claim 10, further comprising determining each cost of each MIP mode based on:
a first difference between a prediction of the first template, using each MIP mode, and the first template; and
a second difference between a prediction of the second template, using each MIP mode, and the second template.

13. The method of claim 10, wherein the reference samples comprise:
left reference samples from a column of samples located to the left of the first template; and
top reference samples from a row of samples located above the second template.

14. The method of claim 10, wherein a prediction of the first template is determined based on a plurality of linear combinations of the reference samples weighted by a weight matrix of each MIP mode.

15. A method comprising:
based on receiving a matrix-based intra prediction (MIP) mode derivation indication, selecting, by a computing device, an MIP mode of a plurality of MIP modes, wherein the selecting the MIP mode is based on a cost, associated with the MIP mode, for predicting a first template and a second template based on reference samples, being lowest of costs associated with the plurality of MIP modes, wherein the reference samples start at a location that is aligned with at least one of:
a location of a top-leftmost sample of the first template; or
a location of a top-leftmost sample of the second template; and
based on the MIP mode, generating a prediction of a block.

16. The method of claim 15, wherein each cost associated with each MIP mode is determined based on:
a prediction, using each MIP mode, of the first template based on first reference samples; and
a prediction, using each MIP mode, of the second template based on second reference samples.

17. The method of claim 15, wherein each cost associated with each MIP mode is determined based on predictions, using each MIP mode, of a first template and a second template based on reference samples.

18. The method of claim 15, wherein:
the first template is located above the block and does not comprise any samples located to the left of the block; and
the second template is located to the left of the block and does not comprise any samples located above the block.

19. The method of claim 15, further comprising:
receiving a prediction error for the block; and
determining, based on the prediction of the block and the prediction error for the block, at least one of luminance sample values or chrominance sample values associated with the block.

20. The method of claim 15, wherein the predicting the first template and the second template comprises predicting the first template and the second template based on reference samples, wherein the reference samples comprise:
left reference samples from a column of samples located to the left of the first template; and
top reference samples from a row of samples located above the second template.

* * * * *